(12) United States Patent
Ito et al.

(10) Patent No.: US 12,431,049 B2
(45) Date of Patent: Sep. 30, 2025

(54) INFORMATION PROCESSING APPARATUS AND CONTROL METHOD

(71) Applicant: Lenovo (Singapore) Pte. Ltd., Singapore (SG)

(72) Inventors: Yoshinori Ito, Kanagawa (JP); Yuichi Sone, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/543,593

(22) Filed: Dec. 18, 2023

(65) Prior Publication Data

US 2024/0257684 A1 Aug. 1, 2024

(30) Foreign Application Priority Data

Jan. 19, 2023 (JP) ................................. 2023-006528

(51) Int. Cl.
  *G06F 1/16* (2006.01)
  *G09G 3/00* (2006.01)

(52) U.S. Cl.
  CPC ........... *G09G 3/035* (2020.08); *G06F 1/1641* (2013.01); *G09G 2340/0464* (2013.01);
  (Continued)

(58) Field of Classification Search
  CPC ........... G09G 3/035; G09G 2340/0464; G09G 2340/0492; G09G 2340/14; G09G 2354/00; G06F 1/1641; G06F 1/1616; G06F 1/1647; G06F 1/1652; G06F 1/1677; G06F 1/1679; G06F 1/1681; G06F 3/14; G06F 9/451
  See application file for complete search history.

(56) References Cited

U.S. PATENT DOCUMENTS

| | | | |
|---|---|---|---|
| 2004/0268213 A1* | 12/2004 | Chan | G06F 8/70 715/272 |
| 2008/0115064 A1* | 5/2008 | Roach | G06F 3/04897 715/730 |

(Continued)

FOREIGN PATENT DOCUMENTS

| | | |
|---|---|---|
| JP | 2009-198734 A | 9/2009 |
| JP | 2018-13850 A | 1/2018 |

(Continued)

*Primary Examiner* — Towfiq Elahi
(74) *Attorney, Agent, or Firm* — Osha Bergman Watanabe & Burton LLP

(57) ABSTRACT

An information processing apparatus switches between a first display mode for one display area and a second display mode for first and second display areas, and when switching from the first display mode to the second display mode is performed, displays a first window having a highest display priority of applications being executed in the first display mode, in the first display area and displays a thumbnail image corresponding to a second window other than the first window, in the second display area. In addition, in a case in which all the windows of the applications being executed are hidden in the first display mode before the switching to the second display mode, the information processing apparatus displays the window of any of the applications being executed, in the first display area when the switching to the second display mode is performed.

15 Claims, 14 Drawing Sheets

(52) U.S. Cl.
CPC . *G09G 2340/0492* (2013.01); *G09G 2340/14* (2013.01); *G09G 2354/00* (2013.01)

(56) References Cited

U.S. PATENT DOCUMENTS

2011/0107272 A1* 5/2011 Aguilar .............. G06F 3/04883
                                                                  345/173
2017/0075559 A1* 3/2017 Jung .................... G06F 1/1677

FOREIGN PATENT DOCUMENTS

| JP | 2022-70081 A | 5/2022 |
| JP | 2022-108147 A | 7/2022 |

\* cited by examiner

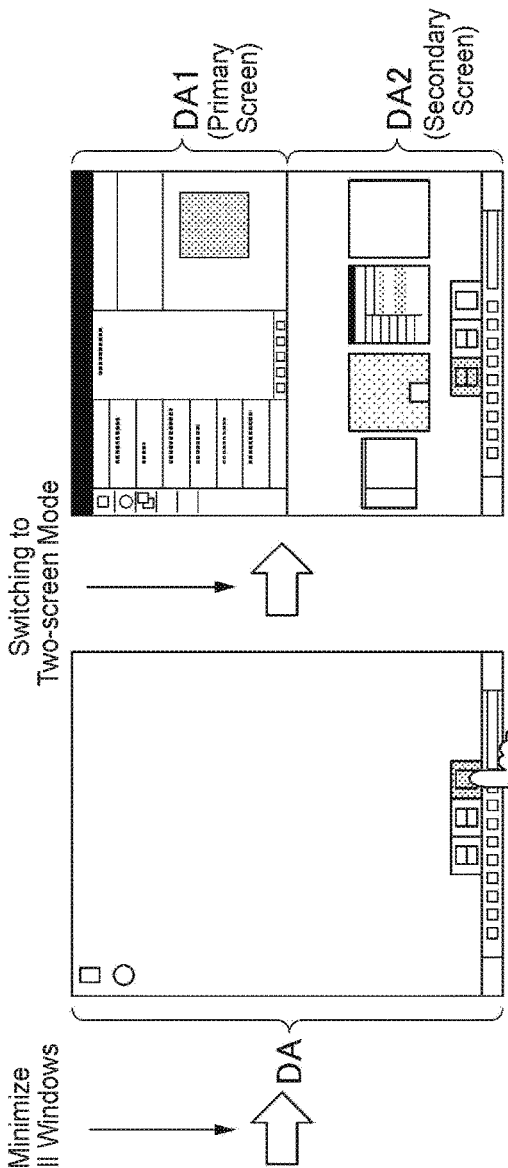
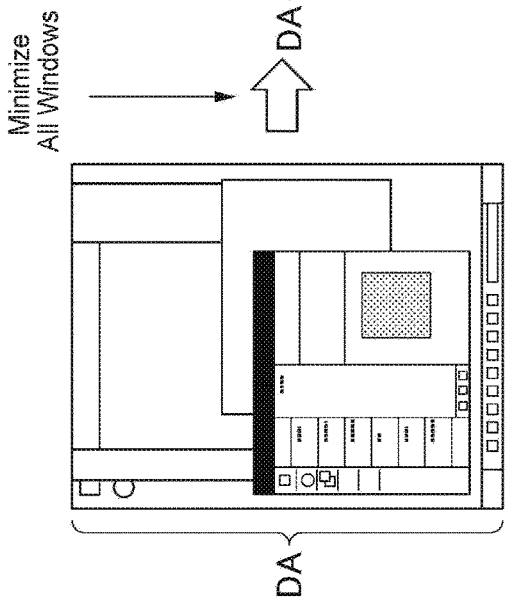
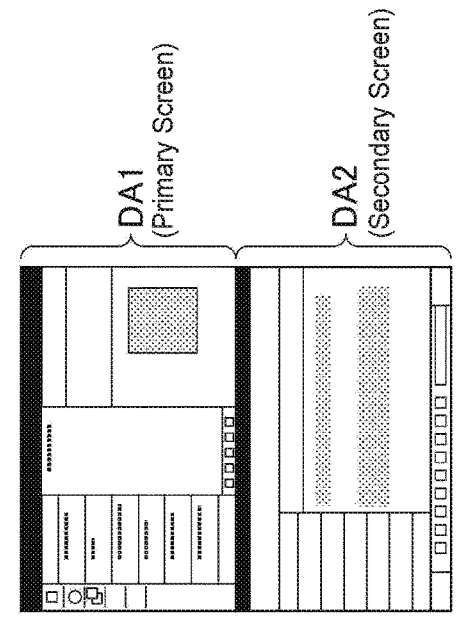
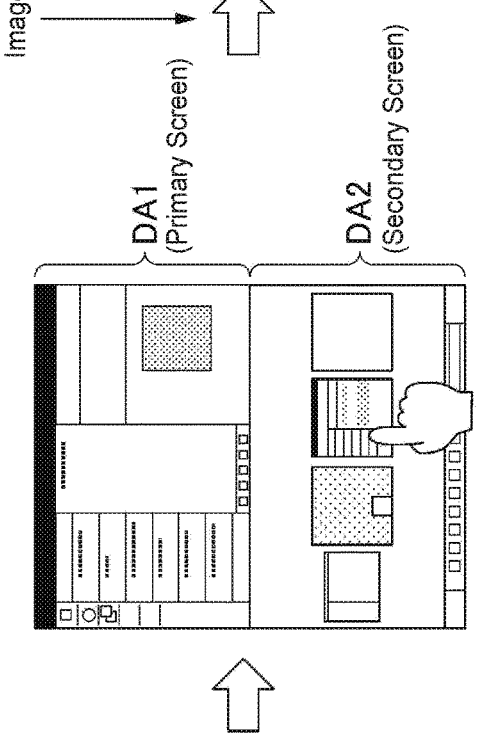

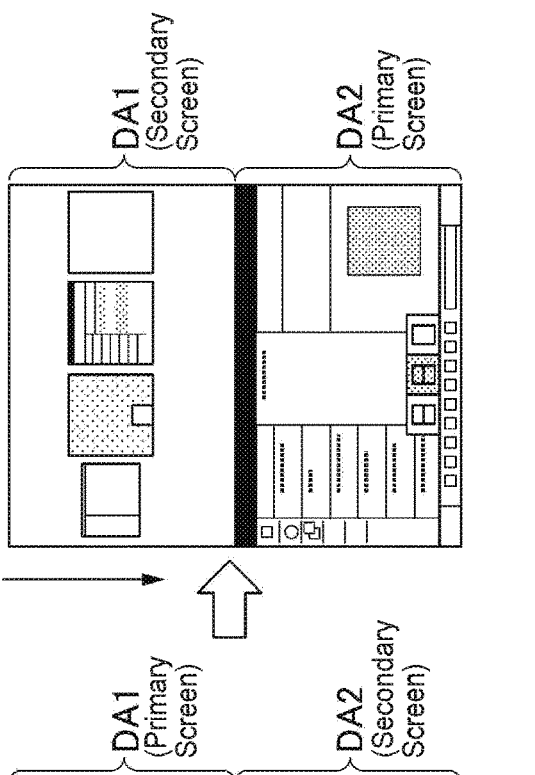
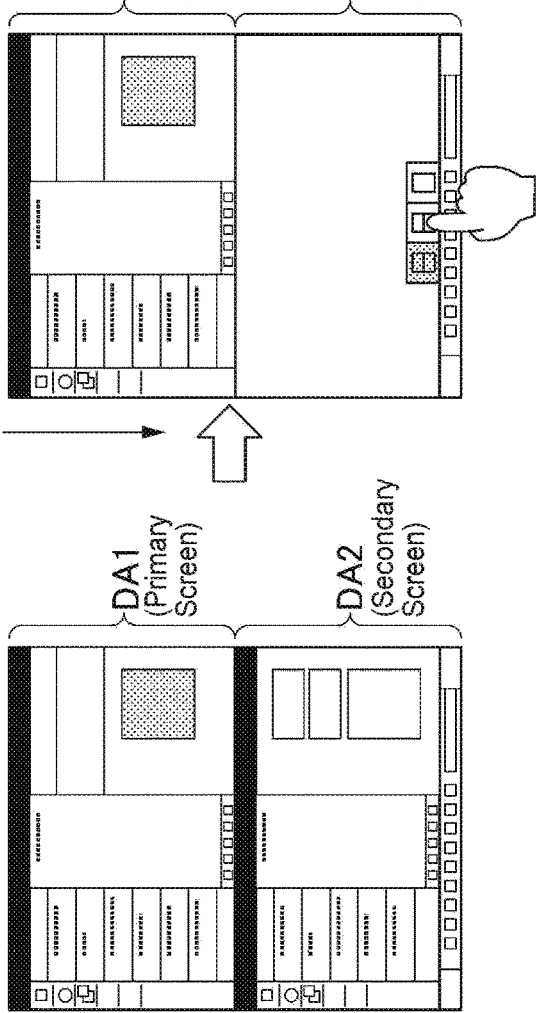

INFORMATION PROCESSING APPARATUS AND CONTROL METHOD

CROSS-REFERENCE TO RELATED APPLICATIONS

This application claims priority to Japanese Patent Application No. 2023-006528 filed on Jan. 19, 2023, the contents of which are hereby incorporated herein by reference in their entirety.

BACKGROUND

Technical Field

The present invention relates to an information processing apparatus and a control method.

Description of Related Art

In recent years, there is an information processing apparatus provided with a foldable flexible display (display unit) (see, for example, Japanese Unexamined Patent Application Publication No. 2018-13850). For example, a configuration is adopted in which one display is provided over a first chassis and a second chassis that can be folded via a connecting portion (hinge mechanism), and the display is also bent as the first chassis and the second chassis are bent. In a case in which one display is provided over the first chassis and the second chassis, in addition to the use of one display as one screen, one display can also be divided into a display area on the first chassis side and a display area on the second chassis side and used as a two-screen configuration in a pseudo manner.

When an application is executed on the information processing apparatus to perform work, there is a case in which it is desired to display an application window on one screen, a case in which it is desired to display a plurality of applications on two screens, or the like. The information processing apparatus that can be used in both a one-screen mode and a two-screen mode as described above is convenient because the one-screen mode and the two-screen mode can be switched and used according to a work content. In addition, there is an information processing apparatus that can be used in a screen mode in which display of two screens is switched even in the two-screen mode. However, when the screen modes are switched, there is a case in which an appropriate display state is not obtained after the switching according to the display state before the switching.

SUMMARY

The present invention has been made in view of the above circumstances, and an object of the present invention is to provide an information processing apparatus and a control method for appropriately controlling display when screen modes having at least a two-screen mode are switched.

The present invention has been made to solve the above problems, and a first aspect of the present invention relates to an information processing apparatus including: one foldable display; a memory configured to store at least a program; and a processor configured to execute the program stored in the memory, in which the processor is configured to: execute the program stored in the memory to perform a display mode switching process of switching between a first display mode in which display is controlled by using a screen area of the display as one display area, and a second display mode in which display is controlled by dividing the screen area into two display areas, a first display area and a second display area, and a display control process of, when switching from the first display mode to the second display mode is performed, displaying a first window having a highest display priority among windows of applications being executed in the first display mode, in the first display area and displaying a thumbnail image corresponding to a second window other than the first window among the applications being executed in the first display mode, in the second display area; and in the display control process, in a case in which all the windows of the applications being executed are hidden in the first display mode before the switching to the second display mode, display the window of any of the applications being executed, in the first display area, when the switching to the second display mode is performed.

In the information processing apparatus, the processor may be configured to: in the display control process, in a case in which all the windows of the applications being executed are hidden in the first display mode before the switching to the second display mode, display the thumbnail image corresponding to the second window other than the window of the application which is displayed in the first display area, in the second display area, when the switching to the second display mode is performed.

In the information processing apparatus, the processor may be configured to: in the display control process, in a case in which all the windows of the applications being executed are hidden in the first display mode before the switching to the second display mode, display the window of any of the applications being executed, as an active window, in the first display area according to a preset priority when the switching to the second display mode is performed.

In the information processing apparatus, the processor may be configured to: in the display mode switching process, perform display area switching of switching between a display mode in which display is controlled by using the first display area as a primary screen and the second display area as a secondary screen in the second display mode, and a display mode in which display is controlled by using the second display area as the primary screen and the first display area as the secondary screen in the second display mode; and in the display control process, in a case in which the display area switching is performed in a state in which all windows displayed on the secondary screen in the second display mode among the windows of the applications being executed are hidden, display the thumbnail image on the secondary screen after the switching.

In the information processing apparatus, the processor may be configured to: in the display mode switching process, perform display area switching of switching between a display mode in which display is controlled by using the first display area as a primary screen and the second display area as a secondary screen in the second display mode, and a display mode in which display is controlled by using the second display area as the primary screen and the first display area as the secondary screen in the second display mode; and in the display control process, when the display area switching is performed, in a case in which there is no display target window to be displayed on the secondary screen after the switching, display thumbnail image on the secondary screen after the switching.

In the information processing apparatus, the processor may be configured to: in the display control process, when the display area switching is performed, in a case in which there is no display target window to be displayed on the primary screen after the switching, display the window of any of the applications being executed, on the primary screen, according to a preset priority.

In the information processing apparatus, the processor may be configured to: in the display control process, when the display area switching is performed, in a case in which there is no display target window to be displayed on the primary screen after the switching, display the thumbnail image on the primary screen.

In addition, a second aspect of the present invention relates to an information processing apparatus including: one foldable display; a memory configured to store at least a program; and a processor configured to execute the program stored in the memory, in which the processor is configured to: execute the program stored in the memory to perform a display mode switching process of switching between a first display mode in which display is controlled by using a screen area of the display as one display area, and a second display mode in which display is controlled by dividing the screen area into two display areas, a first display area and a second display area, and a display control process of, when switching from the first display mode to the second display mode is performed, displaying a first window having a highest display priority among windows of applications being executed in the first display mode, in the first display area and displaying a thumbnail image corresponding to a second window other than the first window among the applications being executed in the first display mode, in the second display area; and in the display control process, when the switching from the first display mode to the second display mode is performed, in a case in which there is no display target window to be displayed in the first display area after the switching, display the window of any of the applications being executed, in the first display area, according to a preset priority.

In addition, a third aspect of the present invention relates to an information processing apparatus relates to including: one foldable display; a memory configured to store at least a program; and a processor configured to execute the program stored in the memory, in which the processor is configured to: execute the program stored in the memory to perform a display mode switching process of switching between a first display mode in which display is controlled by using a screen area of the display as one display area, a second display mode in which display is controlled by dividing the screen area into two display areas, a first display area and a second display area, and using the first display area as a primary screen and the second display area as a secondary screen, and a third display mode in which display is controlled by using the second display area as the primary screen and the first display area as the secondary screen, and a display control process of, when switching from the first display mode to the second display mode is performed, displaying a first window having a highest display priority among windows of applications being executed in the first display mode, on the primary screen and displaying a thumbnail image corresponding to a second window other than the first window among the applications being executed in the first display mode, on the secondary screen; and in the display control process, when the second display mode and the third display mode are switched, display the window of any of the applications being executed, on the primary screen, according to a preset priority in a case in which there is no display target window to be displayed on the primary screen after the switching, and display the thumbnail image on the secondary screen after the switching in a case in which there is no display target window to be displayed on the secondary screen after the switching.

In addition, a fourth aspect of the present invention relates to an information processing apparatus including: one foldable display; a memory configured to store at least a program; and a processor configured to execute the program stored in the memory, in which the processor is configured to: execute the program stored in the memory to perform a display mode switching process of switching between a first display mode in which display is controlled by using a screen area of the display as one display area, a second display mode in which display is controlled by dividing the screen area into two display areas, a first display area and a second display area, and using the first display area as a primary screen and the second display area as a secondary screen, and a third display mode in which display is controlled by using the second display area as the primary screen and the first display area as the secondary screen, and a display control process of, when switching from the first display mode to the second display mode is performed, displaying a first window having a highest display priority among windows of applications being executed in the first display mode, on the primary screen and displaying a thumbnail image corresponding to a second window other than the first window among the applications being executed in the first display mode, on the secondary screen; and in the display control process, when the second display mode and the third display mode are switched, display the thumbnail image on the primary screen in a case in which there is no display target window to be displayed on the primary screen after the switching, and display the thumbnail image on the secondary screen after the switching in a case in which there is no display target window to be displayed on the secondary screen after the switching.

In the information processing apparatus, the priority may be set in advance such that the window of the application being executed, which is hidden later, has a higher priority.

In the information processing apparatus, the priority may be set in advance such that the window of the application being executed, which is activated later, has a higher priority.

In the information processing apparatus, the priority may be set such that a window of an application, which is more frequently used by a user, has a higher priority.

In the information processing apparatus, the processor may be configured to: in the display control process, in a case in which any of the thumbnail images is selected by a user, hide the thumbnail image and display the second window corresponding to the selected thumbnail image, as an active window, in the display area in which the thumbnail image is displayed, out of the first display area and the second display area.

In addition, a fifth aspect of the present invention relates to a control method in an information processing apparatus including one foldable display, a memory configured to store at least a program, and a processor configured to execute the program stored in the memory, the control method including: causing the processor to execute the program stored in the memory to perform a display mode switching step of switching between a first display mode in which display is controlled by using a screen area of the display as one display area, and a second display mode in which display is controlled by dividing the screen area into two display areas, a first display area and a second display area, and a display control step of, when switching from the first display mode to the second display mode is performed, displaying a first window having a highest display priority among windows of applications being executed in the first display mode, in the first display area and displaying a thumbnail image corresponding to a second window other than the first window among the applications being executed in the first display mode, in the second display area, in which, in the display control step, in a case in which all the windows of the applications being executed are hidden in the first display mode before the switching to the second display mode, the window of any of the applications being executed is displayed in the first display area when the switching to the second display mode is performed.

In addition, a sixth aspect of the present invention relates to a control method in an information processing apparatus including one foldable display, a memory configured to store at least a program, and a processor configured to execute the program stored in the memory, the control method including: causing the processor to execute the program stored in the memory to perform a display mode switching step of switching between a first display mode in which display is controlled by using a screen area of the display as one display area, and a second display mode in which display is controlled by dividing the screen area into two display areas, a first display area and a second display area, and a display control step of, when switching from the first display mode to the second display mode is performed, displaying a first window having a highest display priority among windows of applications being executed in the first display mode, in the first display area and displaying a thumbnail image corresponding to a second window other than the first window among the applications being executed in the first display mode, in the second display area, in which, in the display control step, when the switching from the first display mode to the second display mode is performed, in a case in which there is no display target window to be displayed in the first display area after the switching, the window of any of the applications being executed is displayed in the first display area according to a preset priority.

In addition, a seventh aspect of the present invention relates to a control method in an information processing apparatus including one foldable display, a memory configured to store at least a program, and a processor configured to execute the program stored in the memory, the control method including: causing the processor to execute the program stored in the memory to perform a display mode switching step of switching between a first display mode in which display is controlled by using a screen area of the display as one display area, a second display mode in which display is controlled by dividing the screen area into two display areas, a first display area and a second display area, and using the first display area as a primary screen and the second display area as a secondary screen, and a third display mode in which display is controlled by using the second display area as the primary screen and the first display area as the secondary screen, and a display control step of, when switching from the first display mode to the second display mode is performed, displaying a first window having a highest display priority among windows of applications being executed in the first display mode, on the primary screen and displaying a thumbnail image corresponding to a second window other than the first window among the applications being executed in the first display mode, on the secondary screen, in which, in the display control step, when the second display mode and the third display mode are switched, the window of any of the applications being executed is displayed on the primary screen according to a preset priority in a case in which there is no display target window to be displayed on the primary screen after the switching, and the thumbnail image is displayed on the secondary screen after the switching in a case in which there is no display target window to be displayed on the secondary screen after the switching.

In addition, an eighth aspect of the present invention relates to a control method in an information processing apparatus including one foldable display, a memory configured to store at least a program, and a processor configured to execute the program stored in the memory, the control method including: causing the processor to execute the program stored in the memory to perform a display mode switching step of switching between a first display mode in which display is controlled by using a screen area of the display as one display area, a second display mode in which display is controlled by dividing the screen area into two display areas, a first display area and a second display area, and using the first display area as a primary screen and the second display area as a secondary screen, and a third display mode in which display is controlled by using the second display area as the primary screen and the first display area as the secondary screen, and a display control step of, when switching from the first display mode to the second display mode is performed, displaying a first window having a highest display priority among windows of applications being executed in the first display mode, on the primary screen and displaying a thumbnail image corresponding to a second window other than the first window among the applications being executed in the first display mode, on the secondary screen, in which, in the display control step, when the second display mode and the third display mode are switched, the thumbnail image is displayed on the primary screen in a case in which there is no display target window to be displayed on the primary screen after the switching, and the thumbnail image is displayed on the secondary screen after the switching in a case in which there is no display target window to be displayed on the secondary screen after the switching.

The above-described aspects of the present invention can appropriately control display when the screen modes having at least a two-screen mode are switched.

BRIEF DESCRIPTION OF THE DRAWINGS

FIGS. 7A-7E are diagrams illustrating an example of display control when switching from a one-screen mode to the two-screen mode is performed according to the first embodiment.

FIGS. 8A-8C are diagrams illustrating a first example of display control when switching from the two-screen mode to an inverted two-screen mode is performed according to the first embodiment.

DETAILED DESCRIPTION

Hereinafter, embodiments of the present invention will be described with reference to the accompanying drawings.

First Embodiment

First, an outline of a first embodiment of the present invention will be described.

Figure 1:
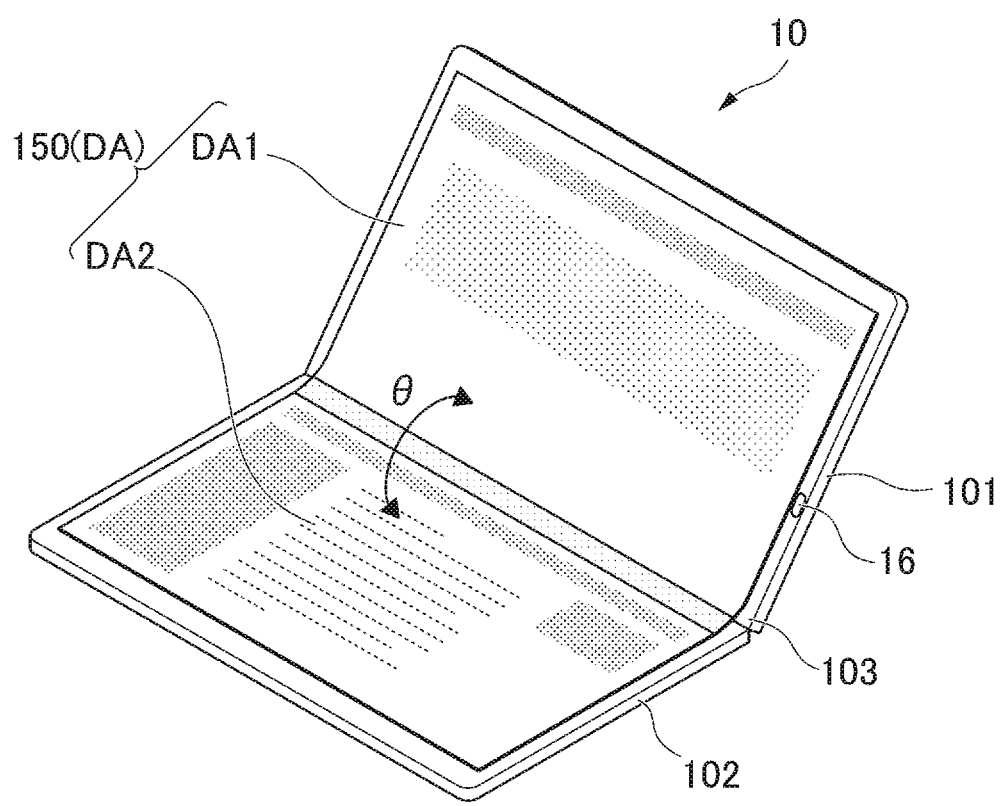
FIG. 1 is a perspective view illustrating an appearance of an information processing apparatus according to a first embodiment.

FIG. 1 is a perspective view illustrating an appearance of an information processing apparatus 10 according to the present embodiment. The information processing apparatus 10 according to the present embodiment is a clamshell (laptop) personal computer (PC). The information processing apparatus 10 is provided with a first chassis 101, a second chassis 102, and a hinge mechanism 103. The first chassis 101 and the second chassis 102 are chassis having a substantially quadrangular plate shape (for example, flat plate shape). One of side surfaces of the first chassis 101 and one of side surfaces of the second chassis 102 are coupled (connected) via the hinge mechanism 103, and the first chassis 101 and the second chassis 102 can relatively move rotationally around a rotation axis formed by the hinge mechanism 103. A state in which an opening angle θ around the rotation axis of the first chassis 101 and the second chassis 102 is about 0° is a state in which the first chassis 101 and the second chassis 102 overlap each other and are closed. A state in which the first chassis 101 and the second chassis 102 are closed will be referred to as a "closed state (closed)". In the closed state, surfaces of the first chassis 101 and the second chassis 102 facing each other will be referred to as "inner surfaces", and surfaces opposite to the inner surfaces will be referred to as "outer surfaces". The opening angle θ can also be referred to as an angle formed by the inner surface of the first chassis 101 and the inner surface of the second chassis 102. A state in which the first chassis 101 and the second chassis 102 are opened with respect to the closed state will be referred to as an "open state". The open state is a state in which the first chassis 101 and the second chassis 102 are relatively moved rotationally until the opening angle θ exceeds a preset threshold value (for example, 10°).

The information processing apparatus 10 is provided with a camera 16 and a display 150. The camera 16 is provided on the inner surface of the first chassis 101. The display 150 is provided over the inner surface of the first chassis 101 and the inner surface of the second chassis 102. The camera 16 is provided in, for example, an outer portion of a screen area of the display 150 on the inner surface of the first chassis 101, and can image a user or the like who exists on the side facing the display 150. The display 150 is a flexible display that can be bent according to the opening angle θ due to the relative rotational movement of the first chassis 101 and the second chassis 102 (see FIGS. 2 and 3). An organic EL display or the like is used as the flexible display. The information processing apparatus 10 can control display of an entire screen area of the display 150 as one display area DA in a one-screen configuration, and can also control display by dividing the entire screen area of the display 150 into two display areas, a first display area DA1 and a second display area DA2, in a two-screen configuration. Here, the first display area DA1 and the second display area DA2 are the display areas that do not overlap each other. Here, among the screen areas of the display 150, a display area corresponding to the inner surface side of the first chassis 101 is defined as the first display area DA1, and a display area corresponding to the inner surface side of the second chassis 102 is defined as the second display area DA2. In the following description, a display mode in which display is controlled with the one-screen configuration will be referred to as a "one-screen mode", and a display mode in which display is controlled with the two-screen configuration will be referred to as a "two-screen mode".

It should be noted that a touch sensor is provided on the screen area of the display 150. The information processing apparatus 10 can detect a touch operation on the screen area of the display 150. By bringing the information processing apparatus 10 into an open state, the user can visually recognize display of the display 150 provided on the inner surface of each of the first chassis 101 and the second chassis 102, or can perform the touch operation on the display 150, and thus can use the information processing apparatus 10.

Hereinafter, a use form and the screen mode of the information processing apparatus 10 will be described in detail. First, the use forms of the information processing apparatus 10 are classified into a state (bent form) in which the first chassis 101 and the second chassis 102 are bent according to the opening angle θ between the first chassis 101 and the second chassis 102, and a flat state (flat form) in which the first chassis 101 and the second chassis 102 are not bent. In the following description, the state (bent form) in which the first chassis 101 and the second chassis 102 are bent will be simply referred to as a "bent state (bent form)", and the flat state (flat form) in which the first chassis 101 and the second chassis 102 are not bent will be simply referred to as a "flat state (flat form)". In the bent state (bent form), the display 150 provided over the first chassis 101 and the second chassis 102 is also in the bent state. In the flat state (flat form), the display 150 is also in the flat state.

Figure 2:
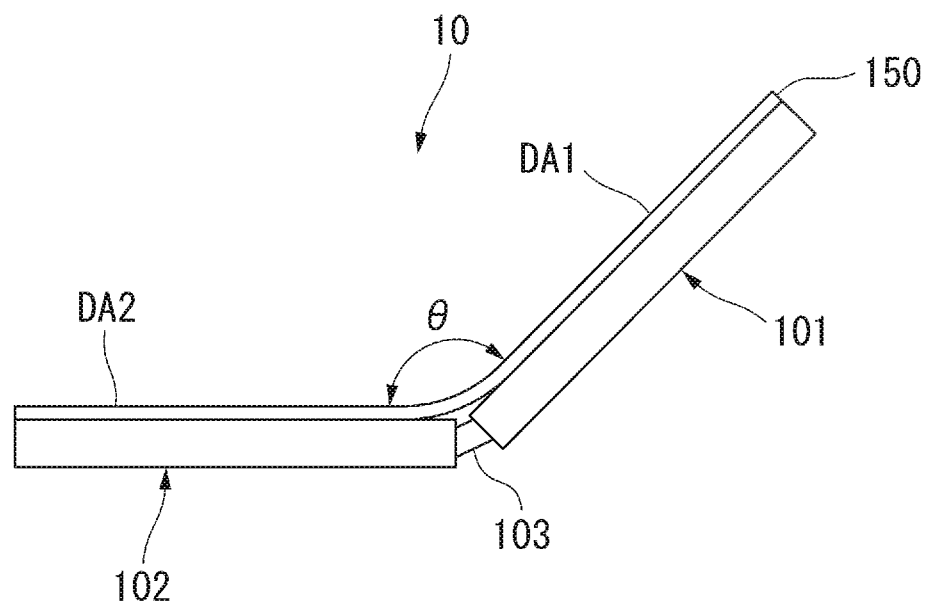
FIG. 2 is a side view illustrating an example of the information processing apparatus in a bent state according to the first embodiment.

FIG. 2 is a side view illustrating an example of the information processing apparatus 10 in the bent state (bent form). The display 150 is arranged over (across) the first chassis 101 and the second chassis 102. The screen area (display area DA illustrated in FIG. 1) of the display 150 can be bent with a portion corresponding to the hinge mechanism 103 as a crease, and the display area on the first chassis 101 side is illustrated as the first display area DA1 and the display area on the second chassis 102 side is illustrated as the second display area DA2 with the crease as a boundary. The display 150 is bent according to the rotational movement (opening angle A) of the first chassis 101 and the second chassis 102. It is determined whether or not the information processing apparatus 10 is in the bent state (bent form) according to the opening angle θ. As an example, in a case in which 10°<θ<170°, it is determined that the information processing apparatus 10 is in the bent state (bent form). This state corresponds to the use form such as a so-called clamshell mode or book mode.

Figure 3:
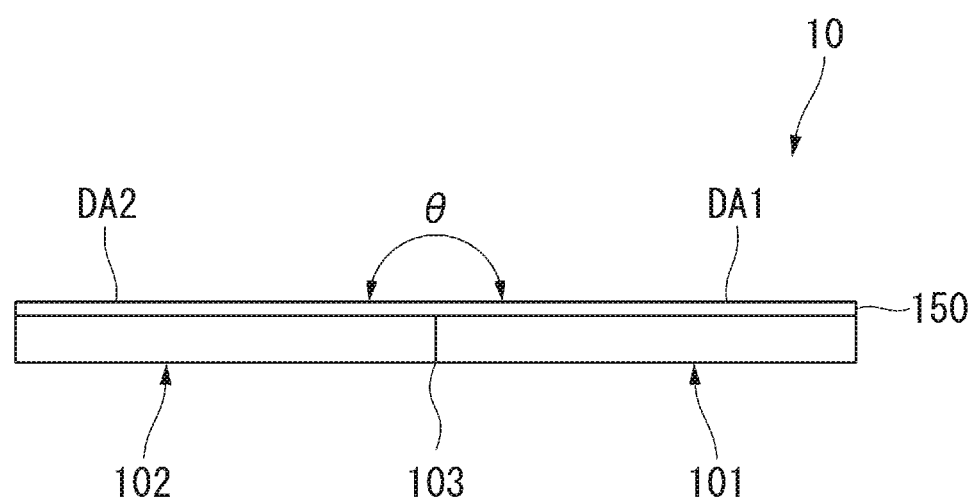
FIG. 3 is a side view illustrating an example of the information processing apparatus in a flat state according to the first embodiment.

FIG. 3 is a side view illustrating an example of the information processing apparatus 10 in the flat state (flat form). It is typically determined that the information processing apparatus 10 is in the flat state (flat form) in a case in which the opening angle θ is 180°, but as an example, it may be determined that the information processing apparatus 10 is in the flat state (flat form) in a case in which 170°≤θ≤180°. For example, in a case in which the opening angle θ between the first chassis 101 and the second chassis 102 is 180°, the display 150 is also in the flat state. This state corresponds to the use form called a so-called tablet mode.

Hereinafter, the display modes according to various use forms of the information processing apparatus 10 will be described in detail with reference to FIG. 4.

Figure 4:
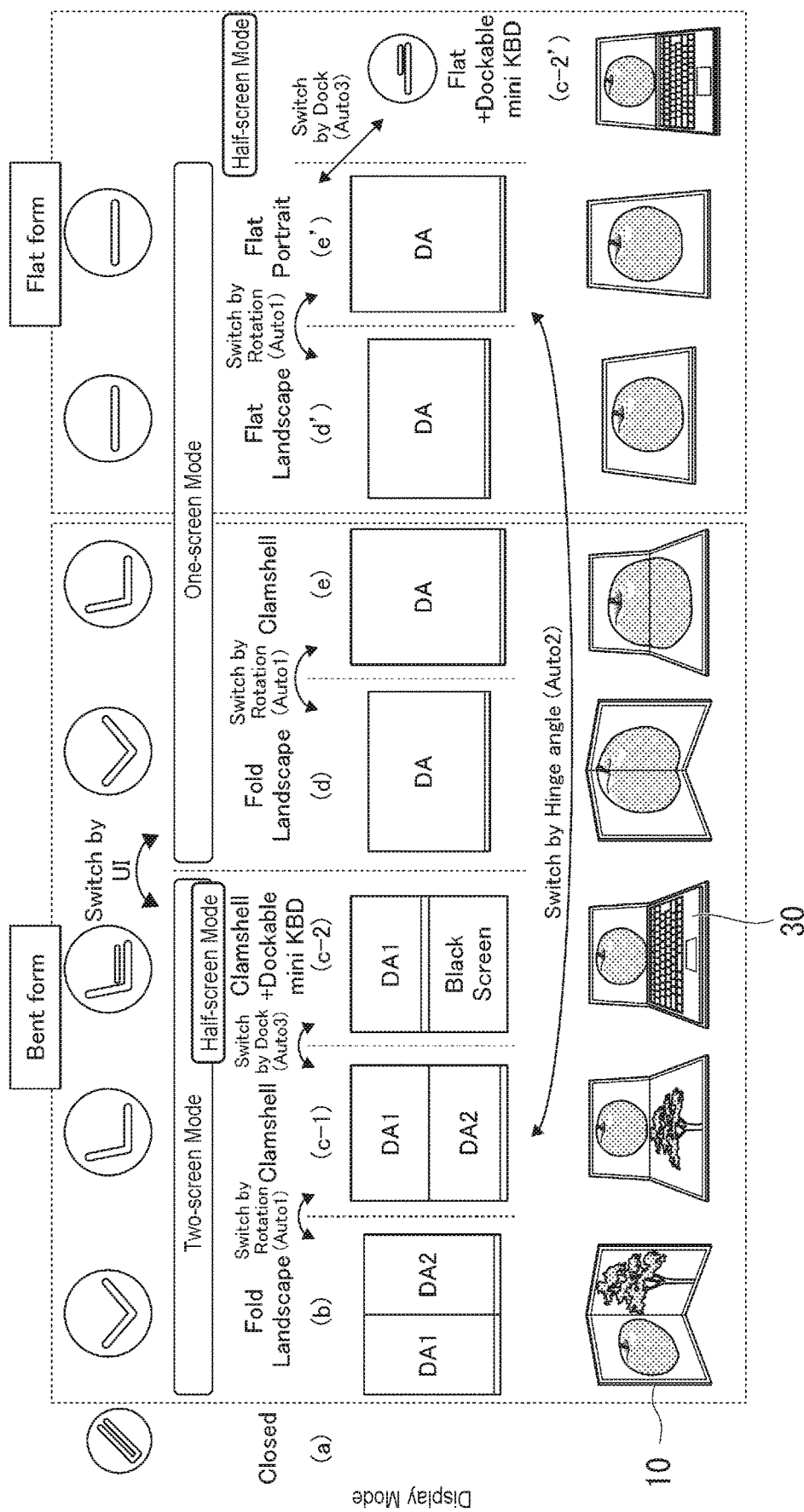
FIG. 4 is a diagram illustrating specific examples of various display modes of the information processing apparatus according to the first embodiment.

FIG. 4 is a diagram illustrating specific examples of various display modes of the information processing apparatus 10 according to the present embodiment. The information processing apparatus 10 has different display modes according to the use forms classified according to the opening angle θ between the first chassis 101 and the second chassis 102, an attitude (orientation) of the information processing apparatus 10, whether the one-screen mode is used or the two-screen mode is used, and the like. It should be noted that the one-screen will also be called a single screen, and the two-screen will also be called a split screen, a dual screen, or the like.

A display mode (a) is a display mode when the first chassis 101 and the second chassis 102 are in the closed state (Closed) as the use form. In this closed state, the information processing apparatus 10 is, for example, in a standby state such as a sleep or hibernation state (hibernation), and the display 150 is in a display-off state. The standby state such as the sleep or hibernation state (hibernation) corresponds to S3 or S4 of a power supply state of a system defined by, for example, an advanced configuration and power interface (ACPI).

A display mode (b) is a display mode when the use form is the bent state (bent form), and the two-screen mode is used in which display is controlled such that the screen area of the display 150 is divided into the two display areas, the first display area DA1 and the second display area DA2. The orientation of the information processing apparatus 10 is an orientation in which the first display area DA1 and the second display area DA2 are in a vertical orientation and are horizontally arranged from side to side. The vertical orientation of the display area is an orientation in which a long side of four sides of a rectangular display area is in a vertical direction and a short side is in a horizontal direction. In a case in which the display area is in the vertical orientation, a display orientation is also the vertical orientation, and display is performed in an orientation in which a direction along the long side corresponds to an up-down direction and a direction along the short side corresponds to a left-right direction. This use form is a use form in which left and right pages when a book is opened correspond to left and right screens, and corresponds to the so-called book mode. This use form will also be referred to as a "Fold Landscape" because the use form is the bent state (bent form), the first display area DA1 and the second display area DA2 are arranged side by side, and the display area obtained by combining the first display area DA1 and the second display area DA2 is horizontally long.

In this display mode (b), for example, in a normal operation state, the information processing apparatus 10 is in the two-screen display mode in which the first display area DA1 on the left side is used as a primary screen and the second display area DA2 on the right side is used as a secondary screen. It should be noted that, in the display mode (b), a correspondence relationship between the first display area DA1 and the second display area DA2, and the primary screen and the secondary screen may be reversed.

As in the display mode (b), a display mode (c-1) is a display mode when the use form is the bent state (bent form), and the two-screen mode is used in which display is controlled by dividing the screen area of the display 150 into two display areas, the first display area DA1 and the second display area DA2, but an orientation of the information processing apparatus 10 is different. The orientation of the information processing apparatus 10 is an orientation in which the first display area DA1 and the second display area DA2 are in a horizontal orientation and are vertically arranged up and down. The horizontal orientation of the display area is an orientation in which a long side of four sides of a rectangular display area is in a horizontal direction and a short side is in a vertical direction. In a case in which the display area is in the horizontal orientation, a display orientation is also the horizontal orientation, and display is performed in an orientation in which a direction along the short side corresponds to an up-down direction and a direction along the long side corresponds to a left-right direction. This use form is one of general use forms of a clamshell PC.

In this display mode (c-1), for example, in a normal operation state, the information processing apparatus 10 is in the two-screen display mode in which the first display area DA1 is used as a primary screen and the second display area DA2 is used as a secondary screen. It should be noted that, in the display mode (c-1), a correspondence relationship between the first display area DA1 and the second display area DA2, and the primary screen and the secondary screen may be reversed.

For example, the information processing apparatus 10 detects a change in the attitude (orientation) of the information processing apparatus 10, and thus automatically performs switching from the display mode (b) to the display mode (c-1) or from the display mode (c-1) to the display mode (b) (Switch by Rotation). For example, since the display mode (c-1) is a state in which the display 150 is rotated 90 degrees rightward with respect to the display mode (b) as illustrated, when the rightward rotation from a state of the display mode (b) by a predetermined angle (for example, 45 degrees) or more is detected, the information processing apparatus 10 performs the switching to the display mode (c-1). Since the display mode (b) is a state in which the display 150 is rotated 90 degrees leftward with respect to the display mode (c-1) as illustrated, when the leftward rotation from a state of the display mode (c-1) by a predetermined angle (for example, 45 degrees) or more is detected, the information processing apparatus 10 performs the switching to the display mode (b).

As in the display mode (c-1), in a display mode (c-2), the bent state (bent form) is used and the orientation of the information processing apparatus 10 is the same, but there is a difference in that an external keyboard 30 (Dockable mini Keyboard (KBD)) that can be connected to the information processing apparatus 10 is connected. This use form is a state in which the physical keyboard 30 is connected in a general use form of a clamshell PC. For example, the keyboard 30 has almost the same size as the second display area DA2, and can be placed on the second display area DA2. As an example, the keyboard 30 is provided with a magnet in an inner portion (end portion) of a bottom surface, and when the keyboard 30 is placed on the second display area DA2, the keyboard 30 is attracted and fixed to a metal portion of an end portion on the inner surface of the second chassis 102. As a result, the use form is the same as the use form of a conventional clamshell PC that is originally provided with the physical keyboard. In addition, the information processing apparatus 10 and the keyboard 30 are connected by, for example, Bluetooth (registered trademark). In this display mode (c-2), the information processing apparatus 10 controls the second display area DA2 to be displayed black or turned off because the second display area DA2 cannot be visually recognized due to the keyboard. In other words, this display mode (c-2) is a display mode (hereinafter, referred to as a "half-screen mode") in which only half screen is valid for display, and is the one-screen mode using only the first display area DA1.

For example, when the information processing apparatus 10 detects the connection with the external keyboard in a state of the display mode (c-1), the information processing apparatus 10 automatically performs the switching from the display mode (c-1) to the display mode (c-2) (Switch by Dock).

As in the display mode (b), in a display mode (d), the bent state (bent form) is used and the orientation of the information processing apparatus 10 is the same, but there is a difference in that the display mode (d) is the one-screen mode in which display is controlled by using the entire screen area of the display 150 is used as one display area DA. This use form is different from the display mode (b) in that the one-screen mode is used, but will also be referred to as the "Fold Landscape" because the bent state (bent form) is used and the display area DA is horizontally long. The display area DA is in the horizontal orientation, and the display orientation is also the horizontal orientation.

Here, the switching between the one-screen mode and the two-screen mode in the bent state (bent form) is performed, for example, by the operation of the user. For example, the information processing apparatus 10 displays an operator as a user interface (UI) that can switch between the one-screen mode and the two-screen mode at any place on the screen, and performs the switching from the display mode (b) to the display mode (d) based on an operation on the operator (Switch by UI). Specific examples of this display mode switching operation will be described below.

As in the display mode (c-1), in a display mode (e), the bent state (bent form) is used and the orientation of the information processing apparatus 10 is the same, but there is a difference in that the display mode (d) is the one-screen mode in which display is controlled by using the entire screen area of the display 150 is used as one display area DA. This use form is different from the display mode (c-1) in that the one-screen mode is used, but corresponds to the use form of the clamshell PC in terms of the bent state (bent form) and the orientation of the information processing apparatus 10. The display area DA is in the vertical orientation, and the display orientation is also the vertical orientation.

For example, the information processing apparatus 10 detects a change in the attitude (orientation) of the information processing apparatus 10, and thus automatically performs switching from the display mode (d) to the display mode (e) or from the display mode (e) to the display mode (d) (Switch by Rotation). For example, since the display mode (e) is a state in which the display 150 is rotated 90 degrees rightward with respect to the display mode (d) as illustrated, when the rightward rotation from a state of the display mode (d) by a predetermined angle (for example, 45 degrees) or more is detected, the information processing apparatus 10 performs the switching to the display mode (e). Since the display mode (d) is a state in which the display 150 is rotated 90 degrees leftward with respect to the display mode (e) as illustrated, when the leftward rotation from a state of the display mode (e) by a predetermined angle (for example, 45 degrees) or more is detected, the information processing apparatus 10 performs the switching to the display mode (d).

As in the display mode (d), in a display mode (d'), the one-screen mode is used and the orientation of the information processing apparatus 10 is an orientation in which the display area DA is horizontally long, but there is a difference in that the flat state (flat form) is used. The flat state (flat form) is a state in which the opening angle θ between the first chassis 101 and the second chassis 102 is about 180°. This use form corresponds to the so-called tablet mode described with reference to FIG. 3, and will also be referred to as the "Flat Landscape" because the flat state (flat form) is used and the display area DA is horizontally long. This display mode (d') is different from the display mode (d) only in terms of the opening angle θ between the first chassis 101 and the second chassis 102. As in the display mode (d), the display area DA is in the horizontal orientation, and the display orientation is also the horizontal orientation.

As in the display mode (e), in a display mode (e'), the one-screen mode is used and the orientation of the information processing apparatus 10 is an orientation in which the display area DA is vertically long, but there is a difference in that the flat state (flat form) is used. This use form will also be referred to as a "Flat Portrait" because the flat state (flat form) is used and the display area DA is vertically long. This display mode (e') is different from the display mode (e) only in terms of the opening angle θ between the first chassis 101 and the second chassis 102. As in the display mode (e), the display area DA is in the vertical orientation, and the display orientation is also the vertical orientation.

For example, the information processing apparatus 10 detects a change in the attitude (orientation) of the information processing apparatus 10, and thus automatically performs switching from the display mode (d') to the display mode (e') or from the display mode (e') to the display mode (d') (Switch by Rotation). For example, since the display mode (e') is a state in which the display 150 is rotated 90 degrees rightward with respect to the display mode (d') as illustrated, when the rightward rotation from a state of the display mode (d') by a predetermined angle (for example, 45 degrees) or more is detected, the information processing apparatus 10 performs the switching to the display mode (e'). Since the display mode (d') is a state in which the display 150 is rotated 90 degrees leftward with respect to the display mode (e') as illustrated, when the leftward rotation from a state of the display mode (e') by a predetermined angle (for example, 45 degrees) or more is detected, the information processing apparatus 10 performs the switching to the display mode (d').

It should be noted that, in the display mode (d') and the display mode (e'), the user can operate the above-described display mode switching icon to perform the switching to the two-screen mode while maintaining the flat state (flat form). For example, when the switching from a state of the display mode (d') to the two-screen mode is performed, the display state is the same as the display state of the display mode (b) in the flat state (flat form). When the switching from a state of the display mode (e') to the two-screen mode is performed, the display state is the same as the display state of the display mode (c-1) in the flat state (flat form).

When the information processing apparatus 10 detects the connection with the keyboard 30 in a state of the display mode (e'), the information processing apparatus 10 automatically performs the switching from the display mode (e') to the display mode (c-2') (Switch by Dock). The display mode (c-2') is the flat state (flat form), and is different from the display mode (c-2) only in terms of the opening angle θ between the first chassis 101 and the second chassis 102. In this display mode (c-2'), the information processing apparatus 10 controls the second display area DA2 to be displayed black or turned off because the second display area DA2 cannot be visually recognized due to the keyboard. In other words, as in the display mode (c-2), this display mode (c-2') is the half-screen mode in which only one half screen is valid for display.

The information processing apparatus 10 can be configured to perform the switching from the one-screen mode to the two-screen mode in a case in which the change from the flat state (flat form) to the bent state (bent form) is detected. For example, in a case in which the change to the bent state (bent form) in a state of the display mode (d') is detected based on the opening angle θ between the first chassis 101 and the second chassis 102, the information processing apparatus 10 automatically performs the switching from the display mode (d') to the display mode (b). In a case in which the change to the bent state (bent form) in a state of the display mode (e') is detected based on the opening angle θ between the first chassis 101 and the second chassis 102, the information processing apparatus 10 automatically performs the switching from the display mode (e') to the display mode (c-1).

(Display Mode Switching Operation)

Figure 5A:
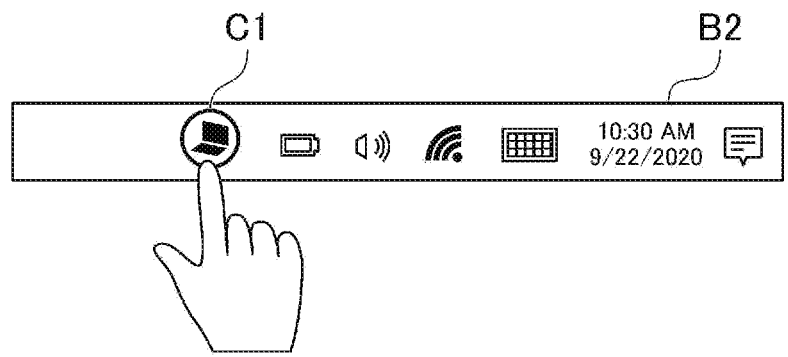
FIGS. 5A-5C are diagrams illustrating an example of an operation specification of a display mode switching operation according to the first embodiment.
Figure 5B:
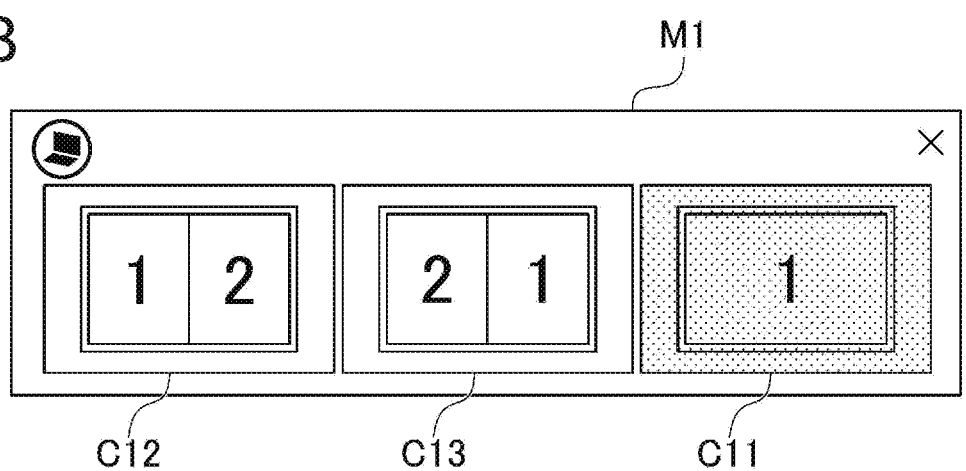
Figure 5C:
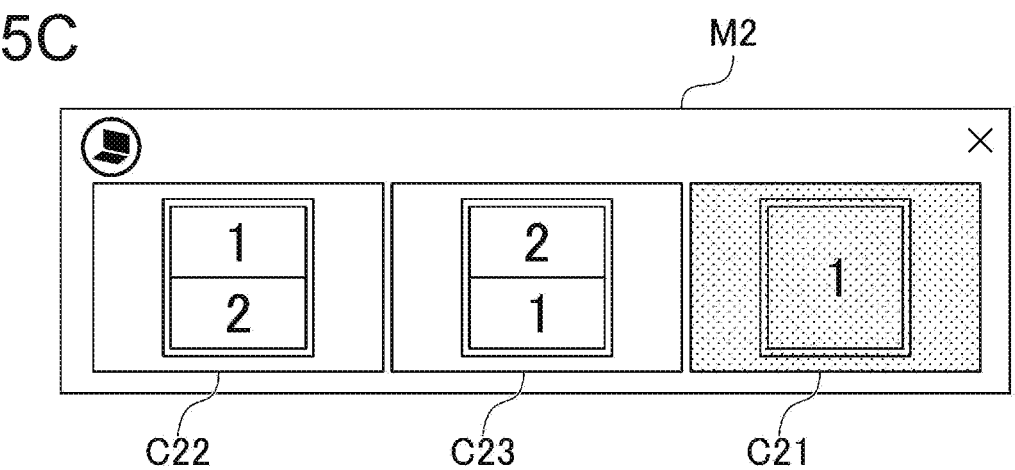

Hereinafter, a specific example of an operation specification when the display modes are switched by the operation of the user will be described. FIGS. 5A-5C are diagrams illustrating an example of the operation specification of the display mode switching operation according to the present embodiment. For example, as illustrated in FIG. 5A, an icon C1 for displaying a switching menu of the display mode is displayed on a task bar B2. The task bar B2 is displayed on any of the screen areas of the display 150. For example, the task bar B2 is displayed only at one location (for example, the bottommost part of the screen area) in the screen area of the display 150 regardless of whether the one-screen mode is used or the two-screen mode is used. It should be noted that, in a case of the two-screen mode, the task bar B2 may be displayed in each of the first display area DA1 and the second display area DA2 (for example, in each bottommost part).

When the operation is performed on the icon C1 for displaying the switching menu, the switching menu of the display mode is displayed as a pop-up screen. It should be noted that the switching menu of the display mode may be displayed as the pop-up screen when the bent state (bent form) is changed to the flat state (flat form) in which the first chassis 101 and the second chassis 102 are not bent. In addition, the switching menu of the display mode may be displayed as the pop-up screen when the flat state (flat form) is changed to the bent state (bent form).

In the switching menu, a display mode switching icon for the user to give an instruction to switch between the one-screen mode and the two-screen mode and to switch (switch between the primary screen and the secondary screen) the display data to be displayed in each of the first display area DA1 and the second display area DA2 in the two-screen mode is displayed as an option of the display mode. In the switching menu, the options of the display mode selectable by the user are displayed according to the use form (orientation of the display 150) in this case.

FIG. 5B illustrates a switching menu M1 displayed when the use form is the "Fold Landscape" (display mode (b), display mode (d), display mode (d'), or the like). It should be noted that, in the drawing, "1" indicates the primary screen, and "2" indicates the secondary screen. A display mode switching icon C11, a display mode switching icon C12, and a display mode switching icon C13 are displayed on the switching menu M1. The display mode switching icon C11 is displayed as an operator for selecting the one-screen mode (display mode (d) and display mode (d')). The display mode switching icon C12 is displayed as an operator for selecting the display mode in which the first display area DA1 is the primary screen and the second display area DA2 is the secondary screen in the two-screen mode (display mode (b)). The display mode switching icon C13 is displayed as an operator for selecting the display mode in which the second display area DA2 is the primary screen and the first display area DA1 is the secondary screen in the two-screen mode (display mode (b)). In the following description, in a case in which the two-screen mode in which the second display area DA2 is the primary screen and the first display area DA1 is the secondary screen is described in a distinguishable manner from the two-screen mode in which the first display area DA1 is the primary screen and the second display area DA2 is the secondary screen, the two-screen mode in which the second display area DA2 is the primary screen and the first display area DA1 is the secondary screen will be referred to as an "inverted two-screen mode".

It should be noted that the display mode switching icon corresponding to the current display mode is displayed in a display aspect that is distinguishable from other display mode switching icons. Here, the display mode switching icons C12 and C13 are highlighted so that it can be seen that the display mode switching icon C11 is the current display mode.

FIG. 5C illustrates a switching menu M2 displayed when the use form is "Clamshell" (display mode (c-1), display mode (e), display mode (e'), and the like). A display mode switching icon C21, a display mode switching icon C22, and a display mode switching icon C23 are displayed on the switching menu M2. The display mode switching icon C21 is displayed as an operator for selecting the one-screen mode (display mode (e) and display mode (e')). The display mode switching icon C22 is displayed as an operator for selecting the display mode in which the first display area DA1 is the primary screen and the second display area DA2 is the secondary screen in the two-screen mode (display mode (c-1)). The display mode switching icon C23 is displayed as an operator for selecting the display mode (that is, the inverted two-screen mode) in which the second display area DA2 is the primary screen and the first display area DA1 is the secondary screen in the two-screen mode (display mode (c-1)).

It should be noted that, similar to the switching menu M1 illustrated in FIG. 5B, the display mode switching icon corresponding to the current display mode is displayed in a display aspect that is distinguishable from other display mode switching icons. Here, the display mode switching icons C22 and C23 are highlighted so that it can be seen that the display mode switching icon C21 is the current display mode.

The user can optionally select any of the display mode switching icons displayed on the switching menu M1 or the switching menu M2. When the user selects any of the display mode switching icons, display of the switching menu is terminated. Alternatively, in a case in which the user does not select any display mode switching icon within a predetermined time (for example, 3 to 5 seconds) after the switching menu M1 or the switching menu M2 is displayed, display of the switching menu is terminated. In addition, in a case in which the user operates a close button "x" on the upper right of the switching menu, in a case in which the user operates an outside of the screen of the popped up switching menu, or in a case in which the orientation of the information processing apparatus 10 is changed, display of the switching menu is terminated. It should be noted that, in a state in which the keyboard 30 is connected, the switching menu is not displayed because the half-screen mode (display mode (c-2)) in which only the first display area DA1 is valid for display is fixed.

It should be noted that the UI for switching between the one-screen mode and the two-screen mode is not limited to the example illustrated in FIGS. 5A-5C, and any UI can be used. For example, an icon for alternately switching between the one-screen mode and the two-screen mode each time the operation is performed, or an icon for switching between the one-screen mode, the two-screen mode, and the inverted two-screen mode in order each time the operation is performed may be displayed on the task bar B2.

(Display Control when One-Screen Mode and Two-Screen Mode are Switched)

Hereinafter, the display control when the one-screen mode and the two-screen mode (or the inverted two-screen mode) are switched will be described. It should be noted that, in the following description, in a case in which the two-screen mode and the inverted two-screen mode are not particularly distinguished, the two-screen mode and the inverted two-screen mode will be collectively referred to as the two-screen mode. First, a display example of when the switching from the one-screen mode to the two-screen mode is performed will be described.

When the transition from the one-screen mode to the two-screen mode is performed, the information processing apparatus 10 displays an active window among windows of applications (hereinafter, simply referred to as "apps") being executed, on the primary screen among the two screens, and displays a thumbnail image of an inactive window on the secondary screen. The active window is a window that is currently selected and is a target for the operation of the user, and is a window displayed in the foreground of the display 150. The active window displayed on the primary screen is a window displayed as the active window in the one-screen mode immediately before the transition to the two-screen mode. On the other hand, the inactive window is a window other than the active window in the one-screen mode immediately before the transition to the two-screen mode. In the following description, a window on which the thumbnail image of the inactive window is displayed will also be referred to as a "thumbnail window".

Figure 6:
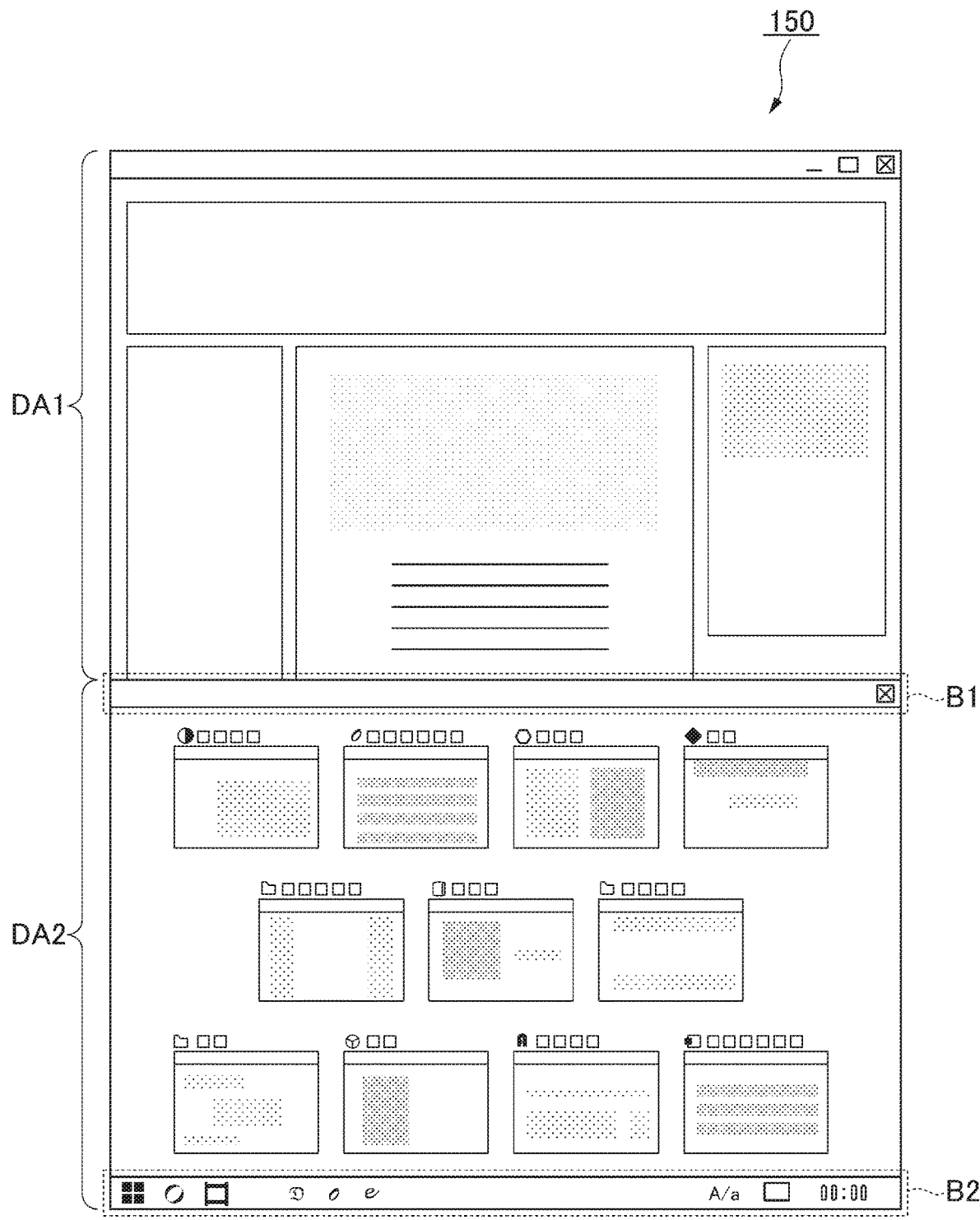
FIG. 6 is a diagram illustrating an example of a display example of a two-screen mode according to the first embodiment.

FIG. 6 is a diagram illustrating a display example in the two-screen mode according to the present embodiment. Here, the display example of the two-screen mode in the display mode (c-1) illustrated in FIG. 4 is illustrated. The general use form of the clamshell PC in the two-screen mode is used, and the orientation is used in which the first display area DA1 and the second display area DA2 are in the horizontal orientation and are vertically arranged up and down. The horizontal orientation of the display area is an orientation in which a long side of four sides of a rectangular display area is in a horizontal direction and a short side is in a vertical direction. The term "vertical" corresponds to the vertical (up-down) direction, and the term "horizontal" corresponds to the horizontal (left-right) direction. The vertical direction is typically a perpendicular direction. That is, the first display area DA1 and the second display area DA2 are arranged such that a lower edge in the display orientation of the first display area DA1 is an upper edge in the display orientation of the second display area DA2. Here, the first display area DA1 corresponds to the primary screen, and the second display area DA2 corresponds to the secondary screen. It should be noted that, in a case of the inverted two-screen mode, the second display area DA2 is the primary screen and the first display area DA1 is the secondary screen.

When the transition from the one-screen mode to the two-screen mode is performed, the information processing apparatus 10 displays the active window of the apps being executed in the one-screen mode, in the first display area DA1 (primary screen). For example, when the transition to the two-screen mode is performed, the information processing apparatus 10 displays (displays on the full screen) the active window, which is displayed in the display area DA in the one-screen mode, as the active window in the foreground in the entire display area of the first display area DA1. In addition, when the transition to the two-screen mode is performed, the information processing apparatus 10 associates the window, which is the inactive window in the one-screen mode, with a layer behind the foreground in which the active window of the first display area DA1 is displayed, in a state in which a layer relationship (overlap order of the windows) in the one-screen mode is maintained. Therefore, in the first display area DA1, the active window is displayed on the full screen, and the inactive window is in a state of existing on the layer behind the active window but not being displayed (not visible to the user).

In addition, when the transition from the one-screen mode to the two-screen mode is performed, the information processing apparatus 10 generates the thumbnail image of the window, which is the inactive window in the one-screen mode, and displays the thumbnail window in the second display area DA2 (secondary screen). When there is a plurality of inactive windows, the information processing apparatus 10 displays a thumbnail window in which the thumbnail images of the plurality of inactive windows are arranged, in the second display area DA2. When any of the thumbnail images is selected by the operation (for example, a tap operation) of the user, the information processing apparatus 10 closes (hides) the thumbnail window displayed in the second display area DA2, and displays the inactive window corresponding to the selected thumbnail image, as the active window, in the second display area DA2. Specifically, as an example, the information processing apparatus 10 moves the inactive window corresponding to the selected thumbnail image from the first display area DA1 to the second display area DA2, and then maximizes and displays (displays on the full screen in the second display area DA2) the inactive window as the active window.

For example, in the thumbnail window, the thumbnail images (reduced images) of one or a plurality of windows are displayed side by side. A title bar B1 is displayed at an upper end of the thumbnail window. A close button "x" at a right end of the title bar B1 is displayed as an operator for closing the thumbnail window. The user can also close (hide) all of the thumbnail images by operating (for example, performing the tap operation) on the close button "x" of the title bar B1.

It should be noted that the inactive windows existing on the layer behind the active window in the first display area DA1 (that is, main bodies (actual windows) of the inactive windows of which the thumbnail images are displayed in the second display area DA2) may be arranged to overlap each other in the same size and in an order of priority so as to be hidden behind the active window, and may be arranged to overlap each other in a smaller size than the active window in the order of priority. In addition, all the inactive windows (that is, the main bodies (actual windows) of the inactive windows of which the thumbnail images are displayed in the second display area DA2) may be minimized once (for example, to be in a state in which only the icon exists on the task bar in Windows (registered trademark)), or may be arranged behind the thumbnail window in a case in which the thumbnail window is not displayed translucently (in a see-through manner). In short, the main body (actual window) of the inactive window of which the thumbnail image is displayed in the second display area DA2 need only be processed so as to be once invisible to the user. Then, in the second display area DA2, the window of the app of the thumbnail image selected thereafter in the thumbnail window is displayed as the active window in the foreground.

In addition, the task bar B2 displayed at a lower end of the second display area DA2 corresponds to the task bar B2 illustrated in FIGS. 5A-5C, and is displayed at one location as a task bar common to the first display area DA1 and the second display area DA2. It should be noted that the position at which the task bar B2 is displayed may be a left end or a right end of the first display area DA1 or the second display area DA2, or may be an upper end of the first display area DA1. In addition, as described above, the task bar may be displayed in each of the first display area DA1 and the second display area DA2. The applicability of the present invention is not restricted even in a case in which the task bar is displayed at any position.

When the transition from the one-screen mode to the two-screen mode is performed, the active window displayed in the display area DA in the one-screen mode is displayed in the first display area DA1 (primary screen), and the thumbnail window is displayed in the second display area DA2 (secondary screen). In addition, when any of the thumbnail images in the thumbnail windows, which are displayed in the second display area DA2, is selected, the inactive window corresponding to the selected thumbnail image is displayed as the active window in the second display area DA2.

It should be noted that, when the transition from the one-screen mode to the two-screen mode is performed, the active window displayed in the display area DA in the one-screen mode is displayed in the first display area DA1 (primary screen), but in a case in which there is no active window, a window having a highest display priority among the windows displayed in the display area DA in the one-screen mode is displayed in the first display area DA1 (primary screen). The window having the highest display priority is typically the active window, but is a window located on the highest layer among the displayed windows regardless of whether or not the window is the active window. For example, there is no active window when a location other than the window is operated in the display area DA, but when the transition from the one-screen mode to the two-screen mode is performed, the window located on the highest layer among the displayed windows is displayed in the first display area DA1 (primary screen) regardless of whether or not the window is the active window. It should be noted that, in order to make the description easier to understand, in the following description, the window having the highest display priority will be described as the "active window".

Here, in the one-screen mode before the switching to the two-screen mode, all the windows of the apps being executed may be hidden. The state in which all the windows are hidden in the one-screen mode is a state in which the windows are not displayed at all in the display area DA, and includes, for example, a state in which all the windows are minimized. Of course, the active window is not displayed in the state in which all the windows are hidden, and thus in a case in which the switching from the one-screen mode to the two-screen mode is performed, there is no display target window to be displayed in the first display area DA1 (primary screen) in the two-screen mode after the switching. Therefore, the window of any of the apps being executed is displayed in the first display area DA1 (primary screen).

FIGS. 7A-7E are diagrams illustrating an example of display control when the switching from the one-screen mode to the two-screen mode is performed according to the present embodiment. FIG. 7A is an example of the display screens corresponding to the display modes (e) or (e') illustrated in FIG. 4, and windows of a plurality of apps being executed are displayed in the display area DA in the one-screen mode. For example, when all the windows of the plurality of apps being executed are minimized, a plurality of windows, which is displayed in the display area DA, is minimized and hidden as illustrated in FIG. 7B.

When the switching from the one-screen mode to the two-screen mode is performed in a state in which the window displayed in the display area DA is minimized, the active window is not displayed in the one-screen mode before the switching, and thus there is no display target window to be displayed in the first display area DA1 (primary screen) in the two-screen mode after the switching. Therefore, as illustrated in FIG. 7C, the window of any of the apps being executed is displayed in the first display area DA1 (primary screen) (minimized window is restored and displayed), and the thumbnail window is displayed in the second display area DA2 (secondary screen).

Here, the window displayed in the first display area DA1 (primary screen) is, for example, a window having a high priority, which is set in advance, among the windows of the apps being executed. The window having a high priority is, for example, the window that is minimized last in the one-screen mode before the switching to the two-screen mode.

It should be noted that, regardless of the priority, the window of any of the apps being executed may be randomly selected and displayed in the first display area DA1 (primary screen).

The window displayed in the first display area DA1 (primary screen) is displayed as, for example, the active window. The window displayed in the first display area DA1

(primary screen) is, for example, maximized and displayed in the entire display area of the first display area DA1.

On the other hand, the thumbnail window displayed in the second display area DA2 (secondary screen) is the thumbnail window in which the thumbnail images of windows (minimized windows or inactive windows) other than the window displayed in the first display area DA1 (primary screen) among the windows (minimized windows) of the apps being executed are arranged. It should be noted that the thumbnail image in this case is generated based on a display content of the window immediately before the minimization.

In a case in which any of the thumbnail images of the thumbnail windows displayed in the second display area DA2 (secondary screen) is selected by the operation (for example, the tap operation) of the user as illustrated in FIG. 7D, even when the inactive window corresponding to the selected thumbnail image is the minimized window, the window is displayed as the active window as illustrated in FIG. 7E in the second display area DA2 (secondary screen). Specifically, the thumbnail window displayed in the second display area DA2 (secondary screen) is closed (hidden), and the minimized window corresponding to the selected thumbnail image is restored and displayed as the active window in the second display area DA2 (secondary screen). For example, the window displayed in the second display area DA2 (secondary screen) is maximized and displayed in the entire display area of the second display area DA2.

It should be noted that, although FIG. 7A-7E illustrate the example of the display control when the switching from the one-screen mode to the two-screen mode is performed, when the switching from the one-screen mode to the inverted two-screen mode is performed, the same display control is performed but only the correspondence relationship between the first display area DA1 and the second display area DA2, and the primary screen and the secondary screen is different.

Hereinafter, the display control when the two-screen mode and the inverted two-screen mode are switched will be described. In a case in which all the windows, which are displayed in the second display area DA2 (secondary screen), are minimized or closed before the switching from the two-screen mode to the inverted two-screen mode is performed, there is no display target window to be displayed in the first display area DA1 (secondary screen) after the switching. In this case, the thumbnail window is displayed in the first display area DA1 (secondary screen).

FIGS. 8A-8C are diagrams illustrating a first example of display control when the switching from the two-screen mode to the inverted two-screen mode is performed according to the present embodiment. FIG. 8A illustrates an example in which the windows of the apps being executed are displayed in the first display area DA1 (primary screen) and the second display area DA2 (secondary screen) in the two-screen mode. Here, in a case in which all the windows displayed in the second display area DA2 (secondary screen) are minimized or closed, the window displayed in the second display area DA2 (secondary screen) is minimized or closed and is hidden, as illustrated in FIG. 8B.

When the switching from the two-screen mode to the inverted two-screen mode is performed in a state in which the window displayed in the second display area DA2 (secondary screen) is hidden, the window displayed in the first display area DA1 (primary screen) before the switching is displayed in the second display area DA2 (primary screen) after the switching, as illustrated in FIG. 8C. On the other hand, since the window is not displayed in the second display area DA2 (secondary screen) before the switching, there is no display target window to be displayed in the first display area DA1 (secondary screen) after the switching. Therefore, the thumbnail window is displayed in the first display area DA1 (secondary screen) after the switching as illustrated in FIG. 8C.

Here, the thumbnail window displayed in the first display area DA1 (secondary screen) is the thumbnail window in which the thumbnail images of the windows (window minimized in the second display area DA2 (secondary screen) before the switching, inactive window in the first display area DA1 (primary screen) before the switching, and the like) other than the window displayed in the second display area DA2 (primary screen) among the windows of the apps being executed are arranged.

In addition, in a case in which all the windows, which are displayed in the first display area DA1 (primary screen), are minimized or closed before the switching from the two-screen mode to the inverted two-screen mode is performed, there is no display target window to be displayed in the second display area DA2 (primary screen) after the switching. In this case, the window of any of the apps being executed is displayed in the second display area DA2 (primary screen).

Figure 9A:
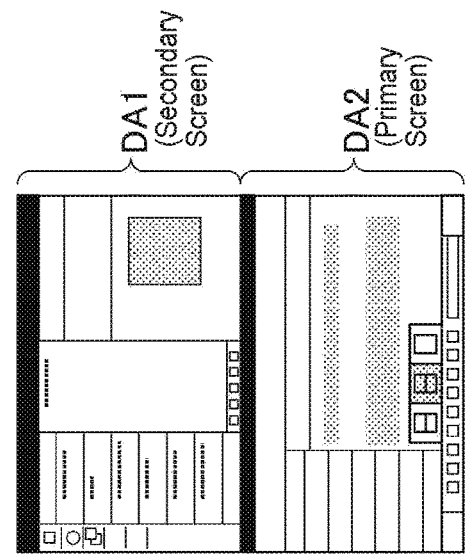
FIGS. 9A-9C are diagrams illustrating a second example of the display control when switching from the two-screen mode to the inverted two-screen mode is performed according to the first embodiment.
Figure 9B:
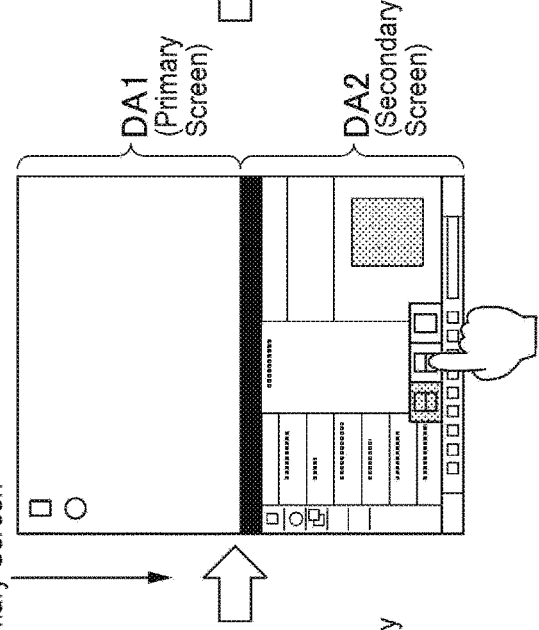
Figure 9C:
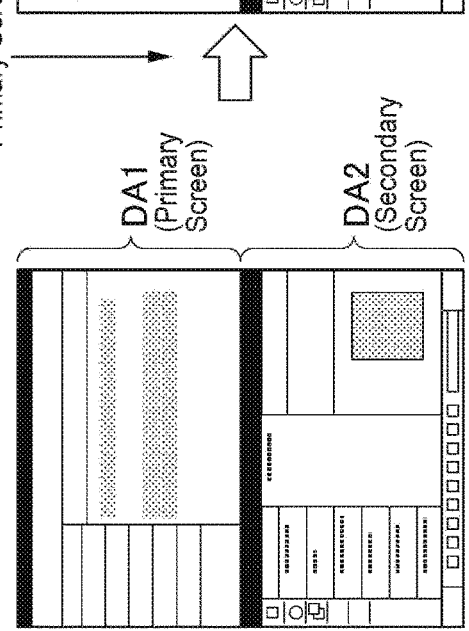

FIGS. 9A-9C are diagrams illustrating a second example of display control when the switching from the two-screen mode to the inverted two-screen mode is performed according to the present embodiment. FIG. 9A illustrates an example in which the windows of the apps being executed are displayed in the first display area DA1 (primary screen) and the second display area DA2 (secondary screen) in the two-screen mode. Here, in a case in which all the windows displayed in the first display area DA1 (primary screen) are minimized or closed, the window displayed in the first display area DA1 (primary screen) is minimized or closed and is hidden, as illustrated in FIG. 9B.

When the switching from the two-screen mode to the inverted two-screen mode is performed in a state in which the window displayed in the first display area DA1 (primary screen) is hidden, the window displayed in the second display area DA2 (secondary screen) before the switching is displayed in the first display area DA1 (secondary screen) after the switching, as illustrated in FIG. 9C. On the other hand, since the window is not displayed in the first display area DA1 (primary screen) before the switching, there is no display target window to be displayed in the second display area DA2 (primary screen) after the switching. Therefore, as illustrated in FIG. 9C, the window of any of the apps being executed is displayed in the second display area DA2 (primary screen) after the switching.

Here, the window displayed in the second display area DA2 (primary screen) is, for example, a window having a high priority, which is set in advance, of the apps being executed. The window having a high priority is, for example, the window that is minimized last in the two-screen mode before the switching to the inverted two-screen mode.

In addition, although FIGS. 8A-8C and 9A-9C illustrate the example of the display control when the switching from the two-screen mode to the inverted two-screen mode is performed, when the switching from the inverted two-screen mode to the two-screen mode is performed, the same display control is performed but only the correspondence relationship between the first display area DA1 and the second display area DA2, and the primary screen and the secondary screen is different.

It should be noted that, with reference to FIGS. 8A-8C and 9A-9C, the example in which the thumbnail window is displayed because there is no display target window to be displayed on the secondary screen after the switching in a case in which all the windows displayed on the secondary screen before the switching are minimized or closed, and the example in which the window having a high priority because there is no display target window to be displayed on the primary screen after the switching in a case in which all the windows displayed on the primary screen before the switching are minimized or closed have been described. In this example, even when the window is not displayed on the secondary screen after the switching or the primary screen after the switching, the window is not displayed even before the switching, so that the feeling of discomfort is small. However, for example, in a case in which the state of the window displayed in the first display area DA1 or the second display area DA2 is changed by using another function different from the function of the present embodiment of switching between the screen modes as described above, there is a case in which the change in the state cannot be grasped by the function of performing the above-described screen mode switching process. For example, the other function is a window snap function in Windows (registered trademark) or a function of controlling a window of another app. In a case in which the window is displayed by, for example, the window snap function in Windows (registered trademark) after all the windows displayed on the secondary screen or the primary screen before the switching are minimized or closed, when the window is not displayed on the secondary screen after the switching or the primary screen after the switching, the user experiences the feeling of discomfort. Therefore, by using the functions of the present embodiment to display the thumbnail window or the window having a high priority on the secondary screen after the switching or the primary screen after the switching, it is possible to suppress the feeling of discomfort.

(Configuration of Information Processing Apparatus 10)

Hereinafter, a specific configuration of the information processing apparatus 10 will be described.

Figure 10:
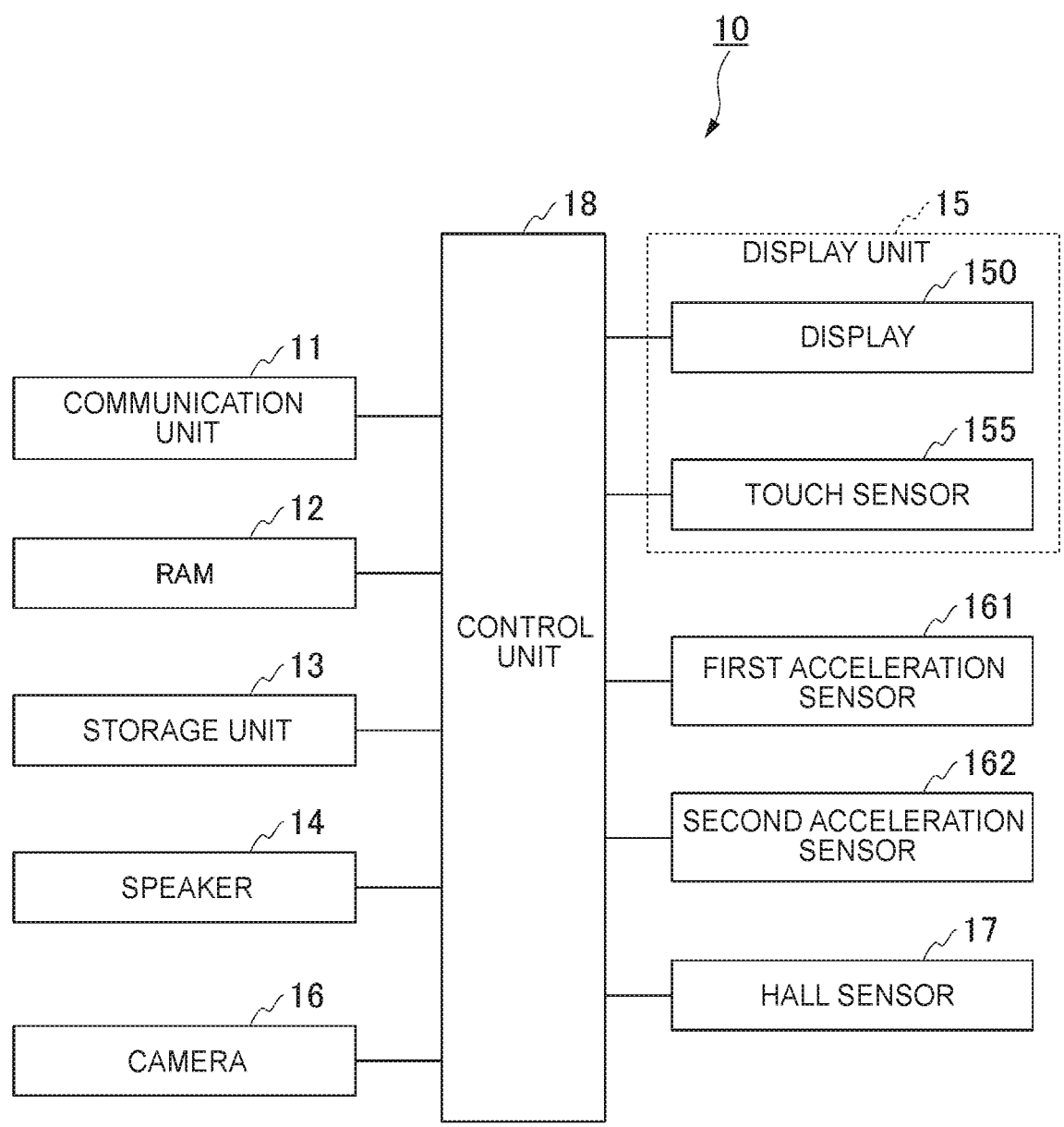
FIG. 10 is a block diagram illustrating a hardware configuration example of the information processing apparatus according to the first embodiment.

FIG. 10 is a block diagram illustrating a hardware configuration example of the information processing apparatus 10 according to the present embodiment. The information processing apparatus 10 is provided with a communication unit 11, a random access memory (RAM) 12, a storage unit 13, a speaker 14, a display unit 15, the camera 16, a first acceleration sensor 161, a second acceleration sensor 162, a hall sensor 17, and a control unit 18. These units are communicably connected to each other via a bus or the like.

The communication unit 11 includes, for example, digital input/output ports such as a plurality of Ethernet (registered trademark) ports or a plurality of universal serial buses (USB), and a communication device that performs wireless communication such as Bluetooth (registered trademark) or Wi-Fi (registered trademark). For example, the communication unit 11 can communicate with the external keyboard 30 or the like described above by using Bluetooth (registered trademark).

A program or data for the process executed by the control unit 18 is loaded in the RAM 12, and various types of data are saved or deleted as appropriate. For example, the RAM 12 also functions as a display video memory (V-RAM) of the display 150. As an example, the RAM 12 functions as a video memory of data displayed in the display area DA when the display 150 is controlled in the one-screen mode. Also, the RAM 12 functions as a video memory of data displayed in the first display area DA1 and the second display area DA2 when the display 150 is controlled in the two-screen mode. In addition, the RAM 12 stores information on the apps being executed, an app being used (app as the active window) among the apps being executed, information on other apps as the inactive window, information on which display area each window is displayed in, and the like. It should be noted that, since the RAM 12 is a volatile memory, the data is not held when the supply of power to the RAM 12 is stopped. The data that needs to be held when the supply of power to the RAM 12 is stopped is transferred to the storage unit 13.

The storage unit 13 includes any one or more of a solid state drive (SSD), a hard disk drive (HDD), a read only memory (ROM), a Flash-ROM, and the like. For example, the storage unit 13 saves a program or setting data of a basic input output system (BIOS), a program of an operating system (OS) or an app operating on the OS, various types of data used in the app, and the like.

The speaker 14 outputs an electronic sound, a voice, or the like.

The display unit 15 is provided with the display 150 and a touch sensor 155. As described above, the display 150 is a flexible display that can be bent according to the opening angle θ due to the relative rotational movement of the first chassis 101 and the second chassis 102. The display 150 performs display corresponding to each display mode described with reference to FIG. 4 according to the control of the control unit 18. The touch sensor 155 is provided on the screen of the display 150, and detects the touch operation on the screen. For example, the touch sensor 155 detects the touch operation on the display area DA in the one-screen mode. In addition, the touch sensor 155 detects the touch operation on one or both of the first display area DA1 and the second display area DA2 in the two-screen mode. A tap operation, a slide operation, a flick operation, a swipe operation, a pinch operation, and the like are included in the touch operation. The touch sensor 155 detects the touch operation to output operation information based on the detected operation to the control unit 18.

The camera 16 includes a lens, an imaging element, and the like. The camera 16 captures an image (a still image or a moving image) according to the control of the control unit 18 to output data of the captured image.

The first acceleration sensor 161 is provided inside the first chassis 101, and detects the orientation of the first chassis 101 and the change in the orientation. For example, assuming that a direction parallel to a longitudinal direction of the first display area DA1 is an X1 direction, a direction parallel to a lateral direction is a Y1 direction, and a direction perpendicular to the X1 direction and the Y1 direction is a Z1 direction, the first acceleration sensor 161 detects acceleration in each of the X1 direction, the Y1 direction, and the Z1 direction to output the detection result to the control unit 18.

The second acceleration sensor 162 is provided inside the second chassis 102, and detects the orientation of the second chassis 102 and the change in the orientation. For example, assuming that a direction parallel to a longitudinal direction of the second display area DA2 is an X2 direction, a direction parallel to a lateral direction is a Y2 direction, and a direction perpendicular to the X2 direction and the Y2 direction is a Z2 direction, the second acceleration sensor 162 detects acceleration in each of the X2 direction, the Y2 direction, and the Z2 direction to output the detection result to the control unit 18.

The hall sensor 17 is provided to detect the connection with the keyboard 30. For example, when the keyboard 30 is placed on the second display area DA2 of the second chassis 102, a magnetic field is changed due to approaching of the magnet provided in the inner portion of the bottom surface of the keyboard 30, and the detection value (output value) of the hall sensor 17 is changed. In other words, the hall sensor 17 outputs different detection results according to whether or not the keyboard 30 is placed.

The control unit 18 includes a processor such as a central processing unit (CPU), a graphic processing unit (GPU), or a microcomputer, and realizes various functions by the processor executing the programs (various programs such as the BIOS, the OS, and the app operating on the OS) stored in the storage unit 13 or the like. For example, the control unit 18 detects the attitude (orientation) of the information processing apparatus 10 based on the detection results of the first acceleration sensor 161 and the second acceleration sensor 162. In addition, the control unit 18 detects, based on the detection results of the first acceleration sensor 161 and the second acceleration sensor 162, whether the information processing apparatus 10 is in the open state or the closed state, and whether the information processing apparatus 10 is in the bent state (bent form) or the flat state (flat form) in a case of the open state, or the like.

In addition, the control unit 18 detects the display mode switching operation (for example, the operation on the display mode switching icon illustrated in FIGS. 5A-5C) by the user. In addition, the control unit 18 detects the connection with the keyboard 30 based on the detection result of the hall sensor 17. It should be noted that the connection with the keyboard 30 refers to the placement of the keyboard 30 on the second display area DA2, and does not refer to communication connection. The control unit 18 detects the communication connection with the keyboard 30 by using a function of Bluetooth (registered trademark) or the like.

In addition, the control unit 18 performs the control of display of the display 150 described with reference to FIGS. 4 and 7 to 9 by detecting the state of the system, the attitude (orientation) of the information processing apparatus 10, whether the information processing apparatus 10 is in the open state or the closed state, whether the information processing apparatus 10 is in the bent state (bent form) or the flat state (flat form) in a case of the open state, the display mode switching operation (see FIGS. 5A-5C) by the user, the connection with the keyboard 30, and the like.

Hereinafter, a functional configuration related to a display control process among the processes executed by the control unit 18 will be described.

Figure 11:
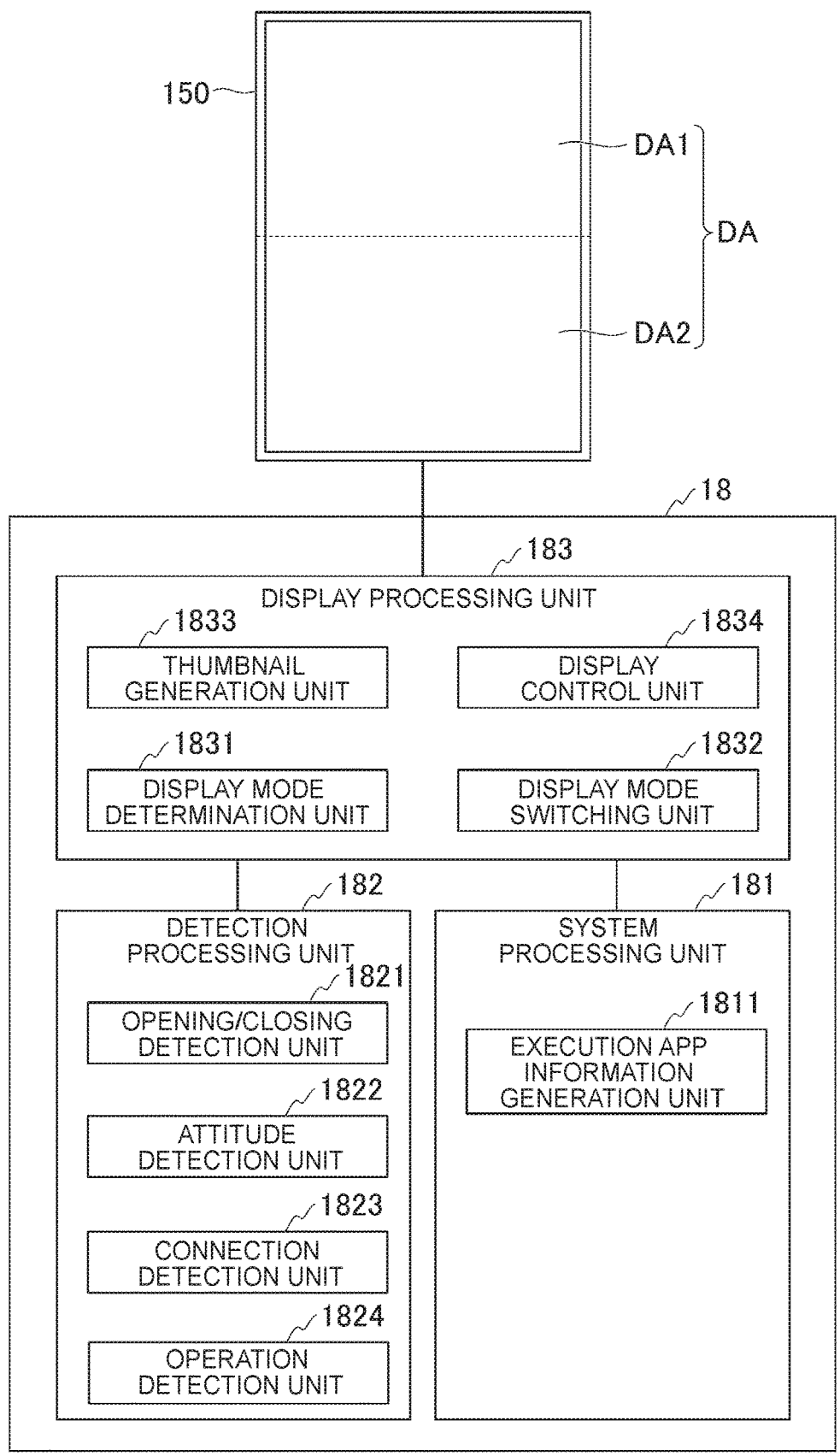
FIG. 11 is a block diagram illustrating a functional configuration example related to a display control process according to the first embodiment.

FIG. 11 is a block diagram illustrating a functional configuration example related to the display control process according to the present embodiment. The control unit 18 is provided with a system processing unit 181, a detection processing unit 182, and a display processing unit 183. Here, the system processing unit 181 has a functional configuration in which the CPU executes the process based on, for example, the OS or the BIOS. The detection processing unit 182 has a functional configuration in which the microcomputer other than, for example, the CPU that executes the process of the OS, the BIOS, or the like executes various detection processes. The display processing unit 183 has a functional configuration in which the CPU executes the process based on, for example, the program operating on the OS.

The system processing unit 181 activates the OS and executes various programs such as a driver and the app operating on the OS. In addition, the system processing unit 181 is provided with an execution app information generation unit 1811. The execution app information generation unit 1811 generates app information including identification information (for example, an app ID) of the apps being executed, information indicating the app being used (that is, the app of which the window is active) by the user among the apps being executed, and the like. In addition, the execution app information generation unit 1811 generates window information indicating a state of the windows of the apps being executed. The state of the window is whether or not the window is the active window, a size of the window (minimization, maximization, and the like), and the like. The execution app information generation unit 1811 stores and holds the generated app information and window information in the RAM 12.

The detection processing unit 182 is provided with an opening/closing detection unit 1821, an attitude detection unit 1822, and a connection detection unit 1823 as a functional configuration for detecting the state of the information processing apparatus 10. The opening/closing detection unit 1821 detects whether the information processing apparatus 10 is in the open state or the closed state based on the detection results of the first acceleration sensor 161 and the second acceleration sensor 162. In a case in which the information processing apparatus 10 is in the open state, the opening/closing detection unit 1821 detects an opening angle θ between the first chassis 101 and the second chassis 102 based on the detection results of the first acceleration sensor 161 and the second acceleration sensor 162. The opening/closing detection unit 1821 detects whether the information processing apparatus 10 is in the bent state (bent form) or the flat state (flat form), based on the detected opening angle θ. The attitude detection unit 1822 detects the attitude (orientation) of the information processing apparatus 10 based on the detection results of the first acceleration sensor 161 and the second acceleration sensor 162. The connection detection unit 1823 detects the connection with the keyboard 30. For example, the connection detection unit 1823 detects whether or not the keyboard 30 is placed on the second display area DA2 based on the detection result of the hall sensor 17, to detect the connection with the keyboard 30. The detection processing unit 182 outputs the detection results (states of the information processing apparatus 10) of the opening/closing detection unit 1821, the attitude detection unit 1822, and the connection detection unit 1823 to the display processing unit 183.

In addition, the detection processing unit 182 is provided with an operation detection unit 1824 as a functional configuration for detecting the operation on the information processing apparatus 10. The operation detection unit 1824 detects the operation of the user based on the operation information output from the touch sensor 155 provided on the screen of the display 150. For example, the operation detection unit 1824 acquires the operation information based on the operation of the user on the switching menu screen (see FIGS. 5A-5C) on which the display modes can be switched, and detects the display mode switching operation of switching between the display modes by the user based on the acquired operation information. The detection processing unit 182 outputs the detected operation information of the user to the display processing unit 183.

The display processing unit 183 determines and switches the display mode based on the open/closed state and the attitude (orientation) of the information processing apparatus 10, the operation of the user, and the like acquired from the detection processing unit 182. In addition, the display processing unit 183 controls display of the windows (active window and inactive window) of the apps being executed, according to the display mode, based on the app information acquired from the system processing unit 181. Specifically, a display mode determination unit 1831, a display mode switching unit 1832, a thumbnail generation unit 1833, and a display control unit 1834 are provided.

The display mode determination unit 1831 performs a determination process of determining the display mode based on the detection result for the state of the information processing apparatus 10 or the operation of the user detected by the detection processing unit 182. For example, the display mode determination unit 1831 acquires the detection result for the open/closed state of the information processing apparatus 10, the detection result for whether the information processing apparatus 10 is in the bent state (bent form) or the flat state (flat form) in a case of the open state, the detection result of the attitude (orientation) of the information processing apparatus 10, and the operation information of the user, from the detection processing unit 182. Then, the display mode determination unit 1831 determines the display mode described with reference to FIG. 4, based on each detection result and the operation information acquired from the detection processing unit 182.

The display mode switching unit 1832 performs a display mode switching process of performing the switching to the display mode described with reference to FIG. 4, based on the display mode determined by the display mode determination unit 1831. For example, the display mode switching unit 1832 switches between the one-screen mode and the two-screen mode (or the inverted two-screen mode), and sets the display mode such as the orientation of each display area, the display content of each display area, and the like, based on the display mode determined by the display mode determination unit 1831.

The thumbnail generation unit 1833 generates the thumbnail image corresponding to the inactive window among the windows of the apps being executed. This thumbnail image is to be displayed in the thumbnail window on the secondary screen (see FIG. 6).

The display control unit 1834 outputs and displays the display data of the window of the app or the thumbnail window to be displayed in each display area according to the display mode set by the display mode switching unit 1832.

For example, in a case in which the display mode switching unit 1832 performs the switching from the one-screen mode to the two-screen mode, the display control unit 1834 displays the active window, which is displayed in the display area DA in the one-screen mode, in the first display area DA1 (primary screen). In addition, in a case in which the display mode switching unit 1832 performs the switching from the one-screen mode to the two-screen mode, the display control unit 1834 displays the thumbnail window, which includes the thumbnail image corresponding to the inactive window other than the active window in the one-screen mode, in the second display area DA2 (secondary screen). It should be noted that, in a case of the inverted two-screen mode, the display control unit 1834 displays the active window in the second display area DA2 (primary screen), and displays the thumbnail window in the first display area DA1 (secondary screen).

In addition, in a case in which all the windows of the apps being executed are minimized in the one-screen mode before the switching to the two-screen mode, the display control unit 1834 displays the window of any of the apps being executed, in the first display area DA1 (primary screen) when the switching to the two-screen mode is performed (see FIGS. 7B-7C). That is, in a case in which there is no display target window (active window in the one-screen mode) to be displayed in the first display area DA1 (primary screen) after the switching when the switching from the one-screen mode to the two-screen mode is performed, the display control unit 1834 displays the window of any of the apps being executed, in the first display area DA1.

In this case, the display control unit 1834 displays, for example, the window of any of the apps being executed, as the active window, in the first display area DA1 (primary screen) according to the preset priority. For example, the priority is set such that the window, which is minimized later in the one-screen mode, has a higher priority. The display control unit 1834 displays, for example, the window minimized last in the one-screen mode before the switching to the two-screen mode, as the active window in the first display area DA1 (primary screen).

It should be noted that, in a case in which all the windows of the apps being executed are minimized in the one-screen mode before the switching to the two-screen mode, when the switching to the two-screen mode is performed, the display control unit 1834 displays the thumbnail window, which includes the thumbnail image corresponding to the inactive window other than the window of the app displayed in the first display area DA1 (primary screen), in the second display area DA2 (secondary screen).

In addition, in a case in which any of the thumbnail images displayed on the secondary screen is selected in the two-screen mode, the display control unit 1834 displays the inactive window (including the minimized window) corresponding to the selected thumbnail image, as the active window on the secondary screen. For example, the display control unit 1834 maximizes and displays the inactive window corresponding to the selected thumbnail image, as the active window on the secondary screen.

In addition, in a case in which the switching from the two-screen mode to the inverted two-screen mode is performed in a state in which all the windows displayed in the second display area DA2 (secondary screen) among the windows of the apps being executed in the two-screen mode are minimized, the display control unit 1834 displays the thumbnail window in the first display area DA1 (secondary screen) after the switching. That is, when the switching from the two-screen mode to the inverted two-screen mode is performed, in a case in which there is no display target window to be displayed in the first display area DA1 (secondary screen) after the switching, the display control unit 1834 displays the thumbnail window in the first display area DA1 (secondary screen) after the switching. It should be noted that, when the switching from the inverted two-screen mode to the two-screen mode is performed, in a case in which there is no display target window to be displayed in the second display area DA2 (secondary screen) after the switching, the display control unit 1834 also displays the thumbnail window in the second display area DA2 (secondary screen) after the switching, in the same manner.

In addition, when the switching from the two-screen mode to the inverted two-screen mode, in a case in which there is no display target window to be displayed in the second display area DA2 (primary screen) after the switching, the display control unit 1834 displays the window of any of the apps being executed, in the second display area DA2 (primary screen) according to the preset priority. It should be noted that, when the switching from the inverted two-screen mode to the two-screen mode, in a case in which there is no display target window to be displayed in the first display area DA1 (primary screen) after the switching, the display control unit 1834 also displays the window of any of the apps being executed, in the first display area DA1 (primary screen) according to the preset priority. For example, the priority is set such that the window, which is minimized later in the one-screen mode, has a higher priority.

Hereinafter, an operation of the display control process executed by the control unit 18 will be described.

First, the operation of the display control process when the switching from the one-screen mode to the two-screen mode is performed will be described with reference to FIG. 12.

Figure 12:
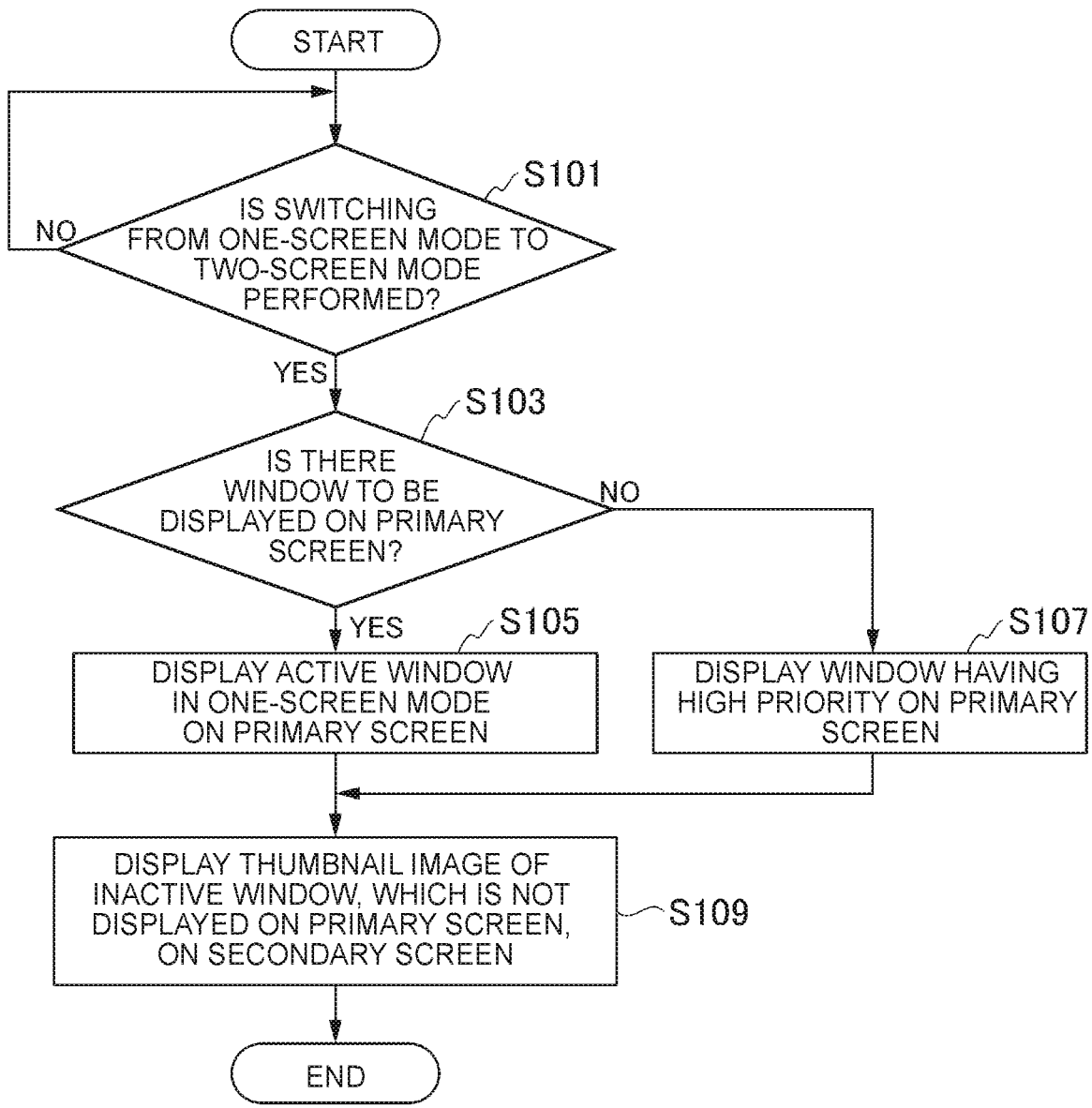
FIG. 12 is a flowchart illustrating an example of the display control process when the switching from the one-screen mode to the two-screen mode is performed according to the first embodiment.

FIG. 12 is a flowchart illustrating an example of the display control process when the switching from the one-screen mode to the two-screen mode is performed according to the present embodiment.

(Step S101) The control unit 18 determines whether or not to perform the switching from the one-screen mode to the two-screen mode. In a case in which the control unit 18 determines not to perform the switching from the one-screen mode to the two-screen mode (NO), the control unit 18 continues the one-screen mode and performs the process of step S101 again. On the other hand, in a case in which the control unit 18 determines to perform the switching from the one-screen mode to the two-screen mode (YES), the control unit 18 performs the switching to the two-screen mode in which the display area DA is divided into the two display areas, the first display area DA1 and the second display area DA2, and proceeds to the process of step S103.

(Step S103) The control unit 18 determines whether or not there is the display target window to be displayed in the first display area DA1 (primary screen) after the switching. For example, in a case in which the active window is displayed in the one-screen mode before the switching, the control unit 18 determines that there is the display target window to be displayed in the first display area DA1 (primary screen) after the switching. In a case in which the control unit 18 determines that there is the display target window to be displayed in the first display area DA1 (primary screen) after the switching (YES), the control unit 18 proceeds to the process of step S105. On the other hand, in a case in which the control unit 18 determines that there is no display target window to be displayed in the first display area DA1 (primary screen) after the switching (NO), the control unit 18 proceeds to the process of step S107.

(Step S105) The control unit 18 displays (for example, displays on the full screen of the primary screen) the active window, which is displayed in the one-screen mode immediately before the switching to the two-screen mode, in the first display area DA1 (primary screen) after the switching. The control unit 18 proceeds to the process of step S109.

(Step S107) The control unit 18 displays (for example, displays on the full screen) the window (for example, the window minimized last) having a high priority among the windows of the apps being executed, in the first display area DA1 (primary screen) after the switching according to the preset priority. The control unit 18 proceeds to the process of step S109.

(Step S109) The control unit 18 displays the thumbnail window, which includes the thumbnail image corresponding to the inactive window (also including the minimized window) that is not displayed in the first display area DA1 (primary screen) among the windows of the apps being executed, in the second display area DA2 (secondary screen).

It should be noted that, when the switching from the one-screen mode to the inverted two-screen mode is performed, in the process described with reference to FIG. 12, the second display area DA2 instead of the first display area DA1 is the primary screen, and the first display area DA1 instead of the second display area DA2 is the secondary screen.

Hereinafter, an operation of the display control process when the thumbnail image is selected in the two-screen mode will be described with reference to FIG. 13.

Figure 13:
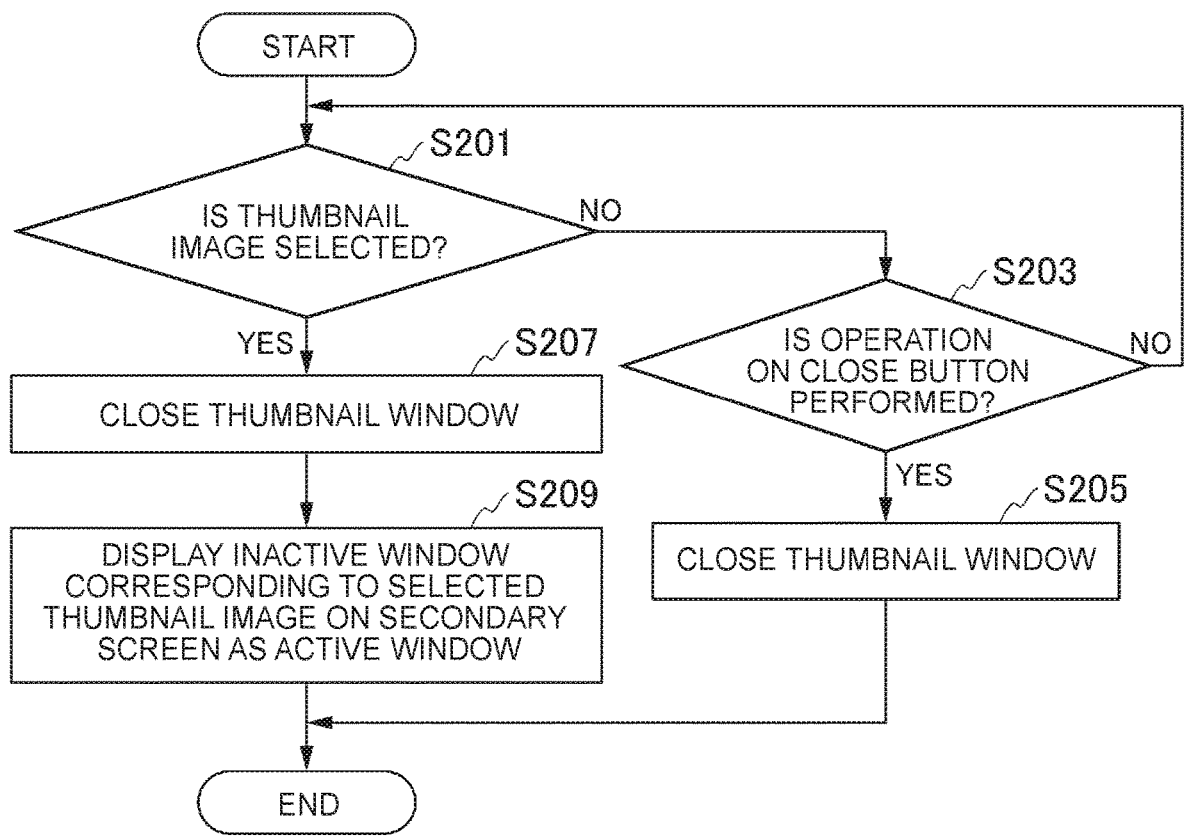
FIG. 13 is a flowchart illustrating an example of the display control process when a thumbnail image is selected according to the first embodiment.

FIG. 13 is a flowchart illustrating an example of the display control process when the thumbnail image is selected according to the present embodiment.

(Step S201) The control unit 18 determines whether or not any of the thumbnail images displayed in the second display area DA2 (secondary screen) is selected. In a case in which the control unit 18 determines that the thumbnail image is not selected (NO), the control unit 18 proceeds to the process of step S203. On the other hand, in a case in which the control unit 18 determines that any of the thumbnail images is selected (YES), the control unit 18 proceeds to the process of step S207.

(Step S203) The control unit 18 determines whether or not the operation is performed on the close button displayed on the title bar of the thumbnail window displayed in the second display area DA2 (secondary screen). In a case in which the control unit 18 determines that the operation is performed on the close button (YES), the control unit 18 proceeds to the process of step S205. On the other hand, in a case in which the control unit 18 determines that the operation is not performed on the close button (NO), the control unit 18 returns to the process of step S201.

(Step S205) In a case in which the control unit 18 determines that the operation is performed on the close button in step S203, the control unit 18 closes and hides the thumbnail window, and terminates the display control process of the thumbnail window.

(Step S207) When the control unit 18 determines that any of the thumbnail images is selected in step S201, the control unit 18 closes the thumbnail window, and proceeds to the process of step S209.

(Step S209) The control unit 18 displays (for example, display on the full screen) the inactive window (including the minimized window) corresponding to the selected thumbnail image, as the active window, in the second display area DA2 (secondary screen).

It should be noted that, in the display control process when the thumbnail image is selected in the inverted two-screen mode, in the process described with reference to FIG. 13, the second display area DA2 instead of the first display area DA1 is the primary screen, and the first display area DA1 instead of the second display area DA2 is the secondary screen.

Hereinafter, an operation of the display control process when the two-screen mode and the inverted two-screen mode are switched will be described with reference to FIG. 14.

Figure 14:
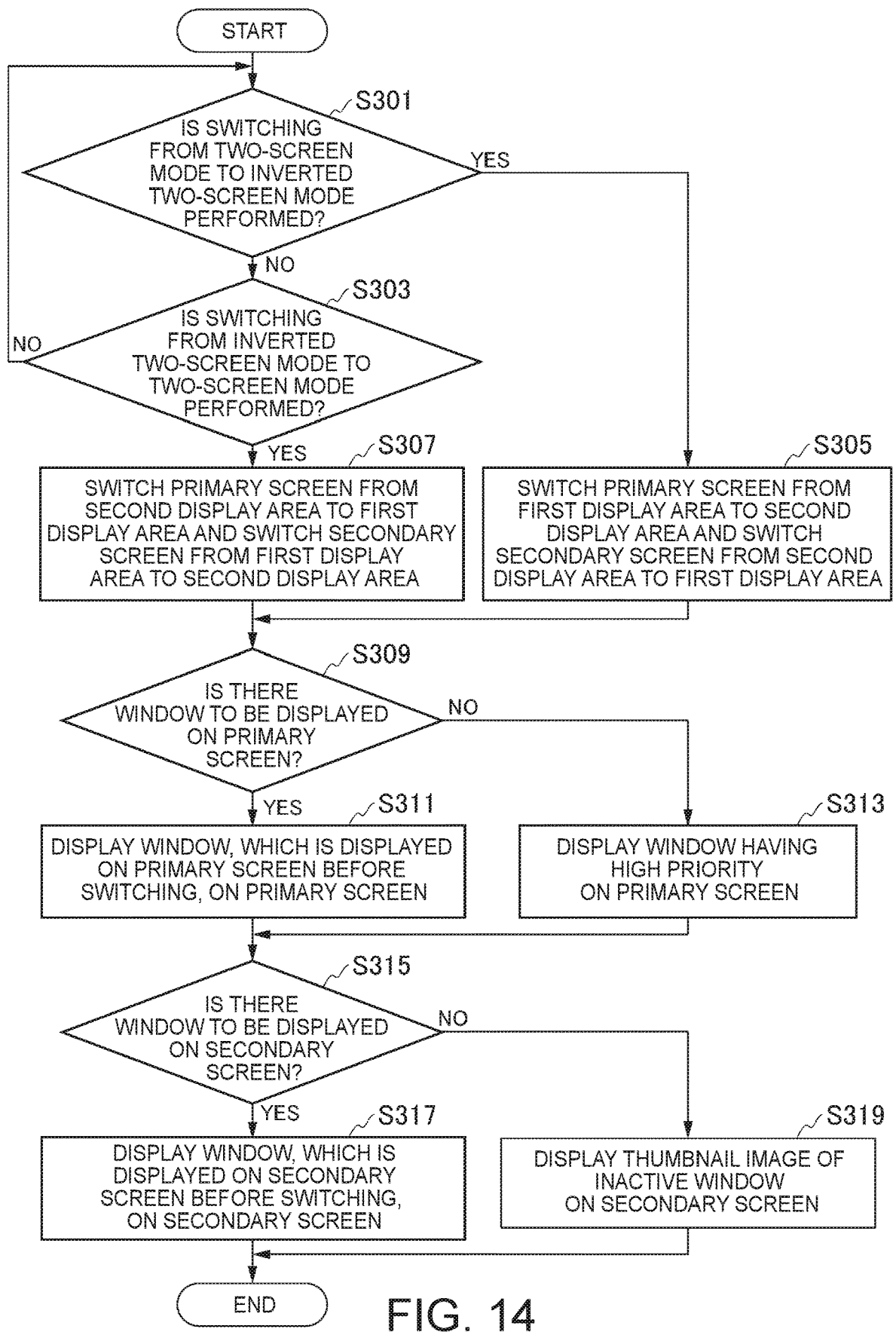
FIG. 14 is a flowchart illustrating an example of the display control process when the two-screen mode and the inverted two-screen mode are switched according to the first embodiment.

FIG. 14 is a flowchart illustrating an example of the display control process when the two-screen mode and the inverted two-screen mode are switched according to the present embodiment.

(Step S301) The control unit 18 determines whether or not to perform the switching from the two-screen mode to the inverted two-screen mode. In a case in which the control unit 18 determines to perform the switching from the two-screen mode to the inverted two-screen mode (YES), the control unit 18 proceeds to the process of step S305. On the other hand, in a case in which the control unit 18 determines not to perform the switching from the two-screen mode to the inverted two-screen mode (NO), the control unit 18 proceeds to the process of step S303.

(Step S303) The control unit 18 determines whether or not to perform the switching from the inverted two-screen mode to the two-screen mode. In a case in which the control unit 18 determines to perform the switching from the inverted two-screen mode to the two-screen mode (YES), the control unit 18 proceeds to the process of step S307. On the other hand, in a case in which the control unit 18 determines not to perform the switching from the inverted two-screen mode to the two-screen mode (NO), the control unit 18 terminates the process without switching between the two-screen mode and the inverted two-screen mode.

(Step S305) The control unit 18 switches the primary screen from the first display area DA1 to the second display area DA2, and sets display of the first display area DA1 before the switching to display of the second display area DA2 after the switching. In addition, the control unit 18 switches the secondary screen from the second display area DA2 to the first display area DA1, and sets display of the second display area DA2 before the switching to display of the first display area DA1 after the switching. The control unit 18 proceeds to the process of step S309.

(Step S307) The control unit 18 switches the primary screen from the second display area DA2 to the first display area DA1, and sets display of the second display area DA2 before the switching to display of the first display area DA1 after the switching. In addition, the control unit 18 switches the secondary screen from the first display area DA1 to the second display area DA2, and sets display of the first display area DA1 before the switching to display of the second display area DA2 after the switching. The control unit 18 proceeds to the process of step S309.

In the following process, since there are a case in which the first display area DA1 is the primary screen and the second display area DA2 is the secondary screen and a case in which the second display area DA2 is the primary screen and the first display area DA1 is the secondary screen, both the cases are assumed and described by using the "primary screen" and the "secondary screen".

(Step S309) The control unit 18 determines whether or not there is the display target window to be displayed on the primary screen. In a case in which the control unit 18 determines that there is the display target window to be displayed on the primary screen (YES), the control unit 18 proceeds to the process of step S311. On the other hand, in a case in which the control unit 18 determines that there is no display target window to be displayed on the primary screen (NO), the control unit 18 proceeds to the process of step S313.

(Step S311) The control unit 18 displays the window, which is displayed on the primary screen before the switching, on the primary screen. The control unit 18 proceeds to the process of step S315.

(Step S313) The control unit 18 displays the window (for example, the window minimized last) having a high priority among the apps being executed, on the primary screen according to the preset priority. The control unit 18 proceeds to the process of step S315.

(Step S315) The control unit 18 determines whether or not there is the display target window to be displayed on the secondary screen. In a case in which the control unit 18 determines that there is the display target window to be displayed on the secondary screen (YES), the control unit 18 proceeds to the process of step S317. On the other hand, in a case in which the control unit 18 determines that there is no display target window to be displayed on the secondary screen (NO), the control unit 18 proceeds to the process of step S319.

(Step S317) The control unit 18 displays the window, which is displayed on the secondary screen before the switching, on the secondary screen.

(Step S319) The control unit 18 displays the thumbnail window, which includes the thumbnail image corresponding to the inactive window (also including the minimized window) that is not displayed on the primary screen among the windows of the apps being executed, on the secondary screen.

As described above, the information processing apparatus 10 according to the present embodiment includes the one foldable display 150, the storage unit 13 (an example of a memory) that stores at least the program, and the control unit 18 (an example of a processor such as a CPU, a GPU, or a microcomputer) that executes the program stored in the storage unit 13. The control unit 18 executes the program stored in the storage unit 13 to perform each of the processes described below. The control unit 18 performs the display mode switching process of switching between the one-screen mode (an example of a first display mode) in which display is controlled by using the screen area of the display 150 as one display area, and the two-screen mode (an example of a second display mode) in which display is controlled by dividing the screen area of the display 150 into the two display areas, the first display area DA1 and the second display area DA2. The control unit 18 performs the display control process of, when the switching from the one-screen mode to the two-screen mode is performed, displaying the active window (an example of a first window having a highest display priority) among the windows of the apps (applications) being executed in the one-screen mode, in the first display area DA1 and displaying the thumbnail image corresponding to the inactive window (an example of a second window) other than the active window among the apps being executed in the one-screen mode, in the second display area DA2. In the display control process, in a case in which all the windows of the apps being executed are hidden (for example, minimized) in the one-screen mode before the switching to the two-screen mode, the control unit 18 displays the window of any of the apps being executed, in the first display area DA1, when the switching to the two-screen mode is performed.

That is, in the display control process, when the switching from the one-screen mode to the two-screen mode is performed, in a case in which there is no display target window to be displayed in the first display area DA1 after the switching, the control unit 18 displays the window of any of the applications being executed, in the first display area DA1 according to the preset priority.

As a result, the information processing apparatus 10 can suppress a state in which the windows are not displayed at all on any of the two screens (display areas) after the switching from the one-screen mode to the two-screen mode, and thus it is possible to appropriately control display when the one-screen mode and the two-screen mode are switched.

For example, in the display control process, in a case in which all the windows of the apps being executed are hidden (for example, minimized) in the one-screen mode before the switching to the two-screen mode, the control unit 18 displays the thumbnail image corresponding to the inactive window other than the window of the app, which is displayed in the first display area DA1, in the second display area DA2 when the switching to the two-screen mode is performed.

As a result, the information processing apparatus 10 can display the thumbnail image excluding the window of the app, which is displayed on one screen (display area), on the other screen (display area) after the switching from the one-screen mode to the two-screen mode is performed.

In addition, for example, in the display control process, in a case in which all the windows of the apps being executed are hidden (for example, minimized) in the one-screen mode before the switching to the two-screen mode, the control unit 18 displays the window of any of the apps being executed, as the active window, in the first display area DA1 according to the preset priority when the switching to the two-screen mode is performed.

As a result, the information processing apparatus 10 can suppress a state in which the windows of the apps being executed are not displayed at all on any of the two screens (display areas) after the switching from the one-screen mode to the two-screen mode, and thus it is possible to display the window of the app having a high priority. Therefore, it is possible to appropriately control display when the one-screen mode and the two-screen mode are switched.

In addition, in the display mode switching process, the control unit 18 can perform the display area switching of switching between the display mode (two-screen mode) in which display is controlled by using the first display area DA1 as the primary screen and the second display area DA2 as the secondary screen in the two-screen mode, and the display mode (inverted two-screen mode) in which display is controlled by using the second display area DA2 as the primary screen and the first display area DA1 as the secondary screen in the two-screen mode. In the display control process, in a case in which the display area switching (switching between the two-screen mode and the inverted two-screen mode) is performed in a state in which all windows displayed on the secondary screen in the two-screen mode among the windows of the apps being executed are hidden (for example, minimized), the control unit 18 displays the thumbnail image corresponding to the inactive window on the secondary screen after the switching.

In other words, in the display control process, when the display area switching (switching between the two-screen mode and the inverted two-screen mode) is performed, in a case in which there is no display target window to be displayed on the secondary screen after the switching, the control unit 18 displays thumbnail image corresponding to the inactive window on the secondary screen after the switching.

As a result, the information processing apparatus 10 can suppress a state in which the thumbnail images or the windows of the apps are not displayed at all on the secondary screen after the switching when the two-screen mode and the inverted two-screen mode are switched, and thus it is possible to appropriately control display when the two-screen mode and the inverted two-screen mode are switched.

In addition, in the display control process, when the display area switching (switching between the two-screen mode and the inverted two-screen mode) is performed, in a case in which there is no display target window to be displayed on the primary screen after the switching, the control unit 18 displays the window of any of the apps being executed, on the primary screen, according to the preset priority.

As a result, the information processing apparatus 10 can suppress a state in which the windows of the apps are not displayed at all on the primary screen after the switching when the two-screen mode and the inverted two-screen mode are switched, and thus it is possible to appropriately control display when the two-screen mode and the inverted two-screen mode are switched.

Here, the priority in a case in which the window of any of the apps being executed is displayed as the active window according to the preset priority is set in advance such that the window of the app being executed, which is hidden (for example, minimized) later, has a higher priority. That is, the window which has a high priority and displayed on the primary screen in a case in which there is no display target window to be displayed on the primary screen after the switching between the screen modes is, for example, the window that is hidden (for example, minimized) last in the one-screen mode before the switching to the two-screen mode.

As a result, the information processing apparatus 10 can preferentially display the window of the app, which is used before the switching between the screen modes, after the switching.

It should be noted that the priority may be set in advance such that the window of the app being executed, which is activated later, has a higher priority. That is, the window which has a high priority and is displayed on the primary screen in a case in which there is no display target window to be displayed on the primary screen after the switching between the screen modes may be, for example, the window that is activated (focused) last in the one-screen mode before the switching to the two-screen mode.

As a result, the information processing apparatus 10 can preferentially display the window of the app, which is used before the switching between the screen modes, after the switching.

In addition, the above-described priority may be set such that the window of the app, which is more frequently used by the user, has a higher priority. It should be noted that a frequency of use may be a frequency based on the number of times the app is used or a frequency based on the time of use. The frequency of use may be aggregated by dividing a period (for example, the last three months). In addition, the frequency may be aggregated separately according to a time zone, and the window of the app having a high priority may differ according to the time zone.

As a result, the information processing apparatus 10 can preferentially display the window of the app, which is frequently used by the user, after the switching between the screen modes.

It should be noted that the above-described priority may be a priority that is aggregated separately for each display mode described with reference to FIG. 4, and the window of the app having a high priority may differ according to the use form (display mode) of the user. In addition, the above-described priority may be a priority that is aggregated separately according to a place of use of the information processing apparatus 10, or the window of the app having a high priority may differ according to a place of use of the user.

In addition, in the display control process, in a case in which any of the thumbnail images is selected by the user, the control unit 18 hides the thumbnail image and displays the inactive window corresponding to the selected thumbnail image, as the active window, in the display area in which the thumbnail image is displayed, out of the first display area DA1 and the second display area DA2.

As a result, the information processing apparatus 10 can easily display the window of the app of the inactive window (also including the hidden (for example, minimized) window) in a usable manner by the user simply selecting the thumbnail image.

In addition, there is a control method in the information processing apparatus 10 according to the present embodiment, the control method including causing the control unit 18 to execute the program stored in the storage unit 13 (an example of a memory) to perform a display mode switching step of switching between the one-screen mode (an example of a first display mode) in which display is controlled by using the screen area of the display 150 as one display area, and the two-screen mode (an example of a second display mode) in which display is controlled by dividing the screen area of the display 150 into the two display areas, the first display area DA1 and the second display area DA2, and a display control step of, when switching from the one-screen mode to the two-screen mode is performed, displaying the active window (an example of a first window having a highest display priority) among the windows of the apps (applications) being executed in the one-screen mode, in the first display area DA1 and displaying the thumbnail image corresponding to the inactive window (an example of a second window) other than the active window among the apps being executed in the one-screen mode, in the second display area DA2, in which, in the display control step, in a case in which all the windows of the apps being executed are hidden (for example, minimized) in the one-screen mode before the switching to the two-screen mode, the window of any of the apps being executed is displayed in the first display area DA1 when the switching to the two-screen mode is performed.

As a result, the information processing apparatus 10 can suppress a state in which the windows are not displayed at all on any of the two screens (display areas) after the switching from the one-screen mode to the two-screen mode, and thus it is possible to appropriately control display when the one-screen mode and the two-screen mode are switched.

In addition, there is a control method in the information processing apparatus 10 according to the present embodiment, the control method including causing the control unit 18 to execute the program stored in the storage unit 13 (an example of a memory) to perform a display mode switching step of switching between the one-screen mode (an example of a first display mode) in which display is controlled by using the screen area of the display 150 as one display area, and the two-screen mode (an example of a second display mode) in which display is controlled by dividing the screen area of the display 150 into the two display areas, the first display area DA1 and the second display area DA2, and a display control step of, when switching from the one-screen mode to the two-screen mode is performed, displaying the active window (an example of a first window having a highest display priority) among the windows of the apps (applications) being executed in the one-screen mode, in the first display area DA1 and displaying the thumbnail image corresponding to the inactive window (an example of a second window) other than the active window among the apps being executed in the one-screen mode, in the second display area DA2, in which, in the display control step, when the switching from the one-screen mode to the two-screen mode is performed, in a case in which there is no display target window to be displayed in the first display area DA1 after the switching, the window of any of the applications being executed is displayed in the first display area DA1 according to the preset priority.

As a result, the information processing apparatus 10 can suppress a state in which the windows are not displayed at all on any of the two screens (display areas) after the switching from the one-screen mode to the two-screen mode, and thus it is possible to appropriately control display when the one-screen mode and the two-screen mode are switched.

In addition, there is a control method in the information processing apparatus 10 according to the present embodiment, the control method including causing the control unit 18 to execute the program stored in the storage unit 13 (an example of a memory) to perform a display mode switching step of switching between the one-screen mode (an example of a first display mode) in which display is controlled by using the screen area of the display 150 as one display area, the two-screen mode (an example of a second display mode) in which display is controlled by dividing the screen area of the display 150 into the two display areas, the first display area DA1 and the second display area DA2, and using the first display area DA1 as the primary screen and the second display area DA2 as the secondary screen, and the inverted two-screen mode (an example of a third display mode) in which display is controlled by using the second display area DA2 as the primary screen and the first display area DA1 as the secondary screen, and a display control step of, when switching from the one-screen mode to the two-screen mode is performed, displaying the active window (an example of a first window having a highest display priority) among the windows of the applications being executed in the one-screen mode, on the primary screen and displaying the thumbnail image corresponding to the inactive window (an example of a second window) other than the active window among the applications being executed in the one-screen mode, on the secondary screen, in which, in the display control step, when the two-screen mode and the inverted two-screen mode are switched, the window of any of the applications being executed is displayed on the primary screen according to the preset priority in a case in which there is no display target window to be displayed on the primary screen after the switching, and the thumbnail image corresponding to the inactive window is displayed on the secondary screen after the switching in a case in which there is no display target window to be displayed on the secondary screen after the switching.

As a result, the information processing apparatus 10 can suppress a state in which the windows of the apps are not displayed at all on the primary screen after the switching and can suppress a state in which the thumbnail images or the windows of the apps are not displayed at all on the secondary screen after the switching when the two-screen mode and the inverted two-screen mode are switched, and thus it is possible to appropriately control display when the two-screen mode and the inverted two-screen mode are switched.

Second Embodiment

Hereinafter, an outline of a second embodiment of the present invention will be described.

In the above-described first embodiment, the example has been described in which, when the two-screen mode and the inverted two-screen mode are switched, in a case in which there is no display target window to be displayed on the primary screen after the switching, the window of any of the apps being executed is displayed on the primary screen, according to the preset priority, but the thumbnail window may be displayed on the primary screen.

For example, when the switching from the two-screen mode to the inverted two-screen mode, in a case in which there is no display target window to be displayed in the second display area DA2 (primary screen) after the switching, the display control unit 1834 displays the thumbnail window including the thumbnail image corresponding to the inactive window (also including the minimized window) in the second display area DA2 (primary screen). I addition, when the switching from the inverted two-screen mode to the two-screen mode, in a case in which there is no display target window to be displayed in the first display area DA1 (primary screen) after the switching, the display control unit 1834 also displays the thumbnail window including the thumbnail image corresponding to the inactive window (also including the minimized window) in the first display area DA1 (primary screen).

Figure 15:
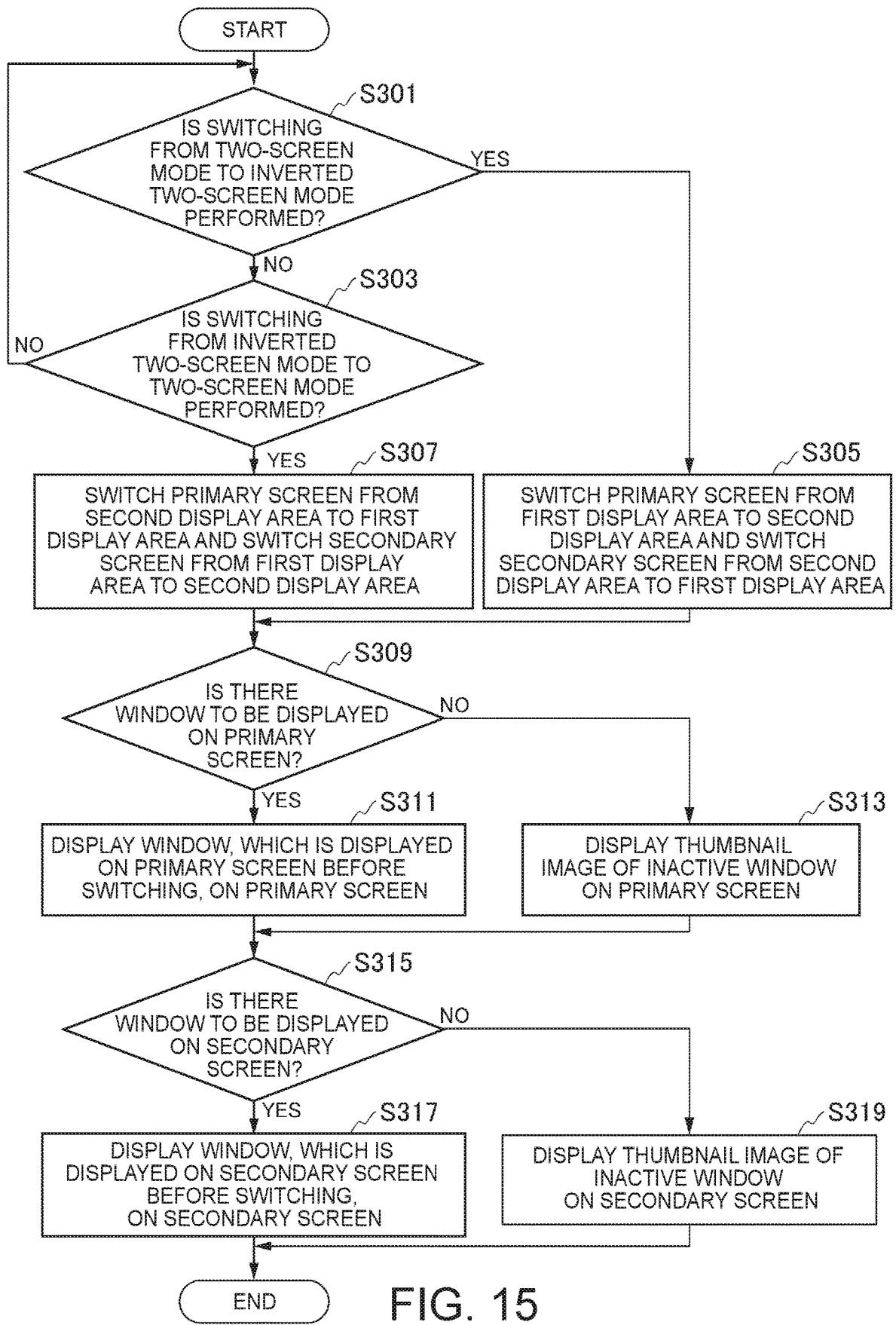
FIG. 15 is a flowchart illustrating an example of a display control process when a two-screen mode and an inverted two-screen mode are switched according to a second embodiment.

FIG. 15 is a flowchart illustrating an example of a display control process when the two-screen mode and the inverted two-screen mode are switched according to the present embodiment. In FIG. 15, the process corresponding to each process of FIG. 14 is denoted by the same reference numeral, and the description thereof will be omitted. The process illustrated in FIG. 15 is different from the process illustrated in FIG. 14 only in terms of the process of step S313A.

(Step S313A) The control unit 18 displays the thumbnail window, which includes the thumbnail image corresponding to the inactive window (also including the minimized window) that is not displayed on the secondary screen among the windows of the apps being executed, on the primary screen. The control unit 18 proceeds to the process of step S315.

As described above, in the display control process, when the display area switching (switching between the two-screen mode and the inverted two-screen mode) is performed, in a case in which there is no display target window to be displayed on the primary screen after the switching, the information processing apparatus 10 according to the present embodiment displays thumbnail image corresponding to the inactive window on the primary screen.

As a result, the information processing apparatus 10 can suppress a state in which the thumbnail images or the windows of the apps are not displayed at all on the primary screen after the switching when the two-screen mode and the inverted two-screen mode are switched, and thus it is possible to appropriately control display when the two-screen mode and the inverted two-screen mode are switched.

In addition, there is a control method in the information processing apparatus 10 according to the present embodiment, the control method including causing the control unit 18 to execute the program stored in the storage unit 13 (an example of a memory) to perform a display mode switching step of switching between the one-screen mode (an example of a first display mode) in which display is controlled by using the screen area of the display 150 as one display area, the two-screen mode (an example of a second display mode) in which display is controlled by dividing the screen area of the display 150 into the two display areas, the first display area DA1 and the second display area DA2, and using the first display area DA1 as the primary screen and the second display area DA2 as the secondary screen, and the inverted two-screen mode (an example of a third display mode) in which display is controlled by using the second display area DA2 as the primary screen and the first display area DA1 as the secondary screen, and a display control step of, when switching from the one-screen mode to the two-screen mode is performed, displaying the active window (an example of a first window having a highest display priority) among the windows of the applications being executed in the one-screen mode, on the primary screen and displaying the thumbnail image corresponding to the inactive window (an example of a second window) other than the active window among the applications being executed in the one-screen mode, on the secondary screen, in which, in the display control step, when the two-screen mode and the inverted two-screen mode are switched, the thumbnail image corresponding to the inactive window is displayed on the primary screen in a case in which there is no display target window to be displayed on the primary screen after the switching, and the thumbnail image corresponding to the inactive window is displayed on the secondary screen after the switching in a case in which there is no display target window to be displayed on the secondary screen after the switching.

As a result, the information processing apparatus 10 can suppress a state in which the thumbnail images or the windows of the apps are not displayed at all on the primary screen after the switching and can suppress a state in which the thumbnail images or the windows of the apps are not displayed at all on the secondary screen after the switching when the two-screen mode and the inverted two-screen mode are switched, and thus it is possible to appropriately control display when the two-screen mode and the inverted two-screen mode are switched. In addition, since the thumbnail image corresponding to the inactive window is displayed on the primary screen, the user can easily select and use the app that the user wants to use.

Although the embodiments of the present invention have been described above in detail with reference to the accompanying drawings, a specific configuration is not limited to the above-described configuration, and various design changes and the like can be made without departing from the gist of the present invention. For example, the configurations described in the above-described embodiments may be optionally combined.

In the above-described embodiments, the example has been described in which the first display area DA1 is used as the primary screen and the second display area DA2 is used as the secondary screen by default in the two-screen mode, and the second display area DA2 is used as the primary screen and the first display area DA1 is used as the secondary screen in the inverted two-screen mode, but a correspondence relationship between the primary screen and the secondary screen may be reversed. In other words, the second display area DA2 may be used as the primary screen and the first display area DA1 may be used as the secondary screen by default in the two-screen mode, and the first display area DA1 may be used as the primary screen and the second display area DA2 may be used as the secondary screen in the inverted two-screen mode.

In the above-described embodiments, the example of the one-screen mode in which display is controlled by using the screen area of the display 150 as one display area DA and the two-screen mode in which display is controlled by dividing the display area into the two screen areas, the first display area DA1 and the second display area DA2, has been described, but the present invention is not limited to the division into the two display areas in a case in which the screen area of the display 150 is divided, and the display area may be divided into three or more display areas. For example, in a case of a three-screen mode in which display is controlled by dividing the screen area of the display 150 into three display areas, one display area among the three display areas may be used as the primary screen and another display area may be used as the secondary screen.

In the above-described embodiments, the example has been described in which one foldable display 150 is used in the one-screen mode and the two-screen mode, but two displays may be used. In other words, the process in each of the above-described embodiments can also be applied to the switching between the one-screen mode in which display is controlled by using the screen area (display area) obtained by combining the screen areas (display areas) of the two displays into one and the two-screen mode in which display of each of the screen areas (display areas) of the two displays is individually controlled.

In the above-described embodiments, the example of the touch operation on the plurality of touch panel type displays in which the input unit (touch sensor) and the display unit are integrally configured has been described, but the present invention is not limited to the touch operation, and a click operation using a mouse, an operation using a gesture, or the like may be performed.

It should be noted that the control unit 18 described above has a computer system inside. The process in each configuration of the control unit 18 described above may be performed by recording a program for realizing the function of each configuration of the control unit 18 described above on a computer-readable recording medium, and reading the program recorded on the recording medium with the computer system to execute the program. Here, "reading the program recorded on the recording medium into the computer system to execute the program" includes installing the program in the computer system. The "computer system" herein includes the OS or hardware such as peripheral devices. In addition, the "computer system" may include a plurality of computer apparatuses connected via a network including a communication line such as the Internet, a WAN, a LAN, or a dedicated line. In addition, the "computer-readable recording medium" is a portable medium such as a flexible disk, a magneto-optical disk, a ROM, or a CD-ROM, and a storage device such as a hard disk built in the computer system. As described above, the recording medium that stores the program may be a non-transitory recording medium such as a CD-ROM.

In addition, the recording medium also includes an internal or external recording medium that can be accessed from a distribution server to distribute the program. It should be noted that a configuration may be used in which the program is divided into a plurality of programs, downloaded at different timings, and then combined with each configuration of the control unit 18, or distribution servers for distributing the respective divided programs may be different. Further, the "computer-readable recording medium" includes a medium, which holds the program for a certain period of time, such as a volatile memory (RAM) inside the computer system that serves as a server or a client in a case in which the program is transmitted via the network. The above-described program may be a program for realizing a part of the above-described functions. Further, the program may be a so-called difference file (difference program) in which the above-described functions can be realized in combination with the program already recorded in the computer system.

A part or all of the functions of the control unit 18 in the above-described embodiments may be realized by an integrated circuit such as a large scale integration (LSI). Each of the functions may be individually realized as a processor, and a part or all of the functions may be integrated into a processor. A method of achieving the integrated circuit is not limited to the LSI, and may be realized by a dedicated circuit or a general-purpose processor. In a case in which advances in a semiconductor technique lead to appearance of an integrated circuit technique that replaces the LSI, an integrated circuit based on the technique may be used.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS

10 information processing apparatus
101 first chassis
102 second chassis
103 hinge mechanism
11 communication unit
12 RAM
13 storage unit
14 speaker
15 display unit
16 camera
150 display
155 touch sensor
161 first acceleration sensor
162 second acceleration sensor
17 hall sensor
18 control unit
181 system processing unit
1811 execution app information generation unit
182 detection processing unit
1821 opening/closing detection unit
1822 attitude detection unit
1823 connection detection unit
1824 operation detection unit
183 display processing unit
1831 display mode determination unit
1832 display mode switching unit
1833 thumbnail generation unit
1834 display control unit

What is claimed is:

1. An information processing apparatus comprising:
one foldable display;
a memory configured to store at least a program; and
a processor configured to execute the program stored in the memory, wherein
the processor is configured to:
  execute the program stored in the memory to perform:
    a display mode switching process of switching between a first display mode in which display is controlled by using a screen area of the display as one display area, and a second display mode in which display is controlled by dividing the screen area into two display areas, a first display area and a second display area, and
    a display control process of, when switching from the first display mode to the second display mode is performed, displaying a first window having a highest display priority among windows of applications being executed in the first display mode, in the first display area and displaying a first thumbnail image corresponding to a second window other than the first window among the applications being executed in the first display mode, in the second display area,
  in the display control process, in a case in which all the windows of the applications being executed are hidden in the first display mode before the switching to the second display mode, display the window of any of the applications being executed, in the first display area, when the switching to the second display mode is performed, and in the display control process, in a case in which any of a plurality of thumbnail images is selected by a user, hide the first thumbnail image and display the second window corresponding to the selected thumbnail image, as an active window, in the display area in which the first thumbnail image is displayed, out of the first display area and the second display area.

2. The information processing apparatus according to claim 1, wherein the processor is configured to:

in the display control process, in a case in which all the windows of the applications being executed are hidden in the first display mode before the switching to the second display mode, display the first thumbnail image corresponding to the second window other than the window of the application which is displayed in the first display area, in the second display area, when the switching to the second display mode is performed.

3. The information processing apparatus according to claim 1, wherein the processor is configured to:

in the display control process, in a case in which all the windows of the applications being executed are hidden in the first display mode before the switching to the second display mode, display the window of any of the applications being executed, as an active window, in the first display area according to a preset priority when the switching to the second display mode is performed.

4. The information processing apparatus according to claim 1, wherein the processor is configured to:

in the display mode switching process, perform display area switching of switching between a display mode in which display is controlled by using the first display area as a primary screen and the second display area as a secondary screen in the second display mode, and a display mode in which display is controlled by using the second display area as the primary screen and the first display area as the secondary screen in the second display mode, and in the display control process, in a case in which the display area switching is performed in a state in which all windows displayed on the secondary screen in the second display mode among the windows of the applications being executed are hidden, display the first thumbnail image on the secondary screen after the switching.

5. The information processing apparatus according to claim 1, wherein the processor is configured to:

in the display mode switching process, perform display area switching of switching between a display mode in which display is controlled by using the first display area as a primary screen and the second display area as a secondary screen in the second display mode, and a display mode in which display is controlled by using the second display area as the primary screen and the first display area as the secondary screen in the second display mode, and in the display control process, when the display area switching is performed, in a case in which there is no display target window to be displayed on the secondary screen after the switching, display the first thumbnail image on the secondary screen after the switching.

6. The information processing apparatus according to claim 5, wherein the processor is configured to:

in the display control process, when the display area switching is performed, in a case in which there is no display target window to be displayed on the primary screen after the switching, display the window of any of the applications being executed, on the primary screen, according to a preset priority.

7. The information processing apparatus according to claim 5, wherein the processor is configured to:

in the display control process, when the display area switching is performed, in a case in which there is no display target window to be displayed on the primary screen after the switching, display the first thumbnail image on the primary screen.

8. An information processing apparatus comprising:
one foldable display;
a memory configured to store at least a program; and
a processor configured to execute the program stored in the memory, wherein
the processor is configured to:
execute the program stored in the memory to perform:
a display mode switching process of switching between a first display mode in which display is controlled by using a screen area of the display as one display area, and a second display mode in which display is controlled by dividing the screen area into two display areas, a first display area and a second display area, and
a display control process of, when switching from the first display mode to the second display mode is performed, displaying a first window having a highest display priority among windows of applications being executed in the first display mode, in the first display area and displaying a first thumbnail image corresponding to a second window other than the first window among the applications being executed in the first display mode, in the second display area,
in the display control process, when the switching from the first display mode to the second display mode is performed, in a case in which there is no display target window to be displayed in the first display area after the switching, display the window of any of the applications being executed, in the first display area, according to a preset priority, and
in the display control process, in a case in which any of a plurality of thumbnail images is selected by a user, hide the first thumbnail image and display the second window corresponding to the selected thumbnail image, as an active window, in the display area in which the first thumbnail image is displayed, out of the first display area and the second display area.

9. An information processing apparatus comprising:
one foldable display;
a memory configured to store at least a program; and
a processor configured to execute the program stored in the memory, wherein
the processor is configured to:
execute the program stored in the memory to perform:
a display mode switching process of switching between a first display mode in which display is controlled by using a screen area of the display as one display area, a second display mode in which display is controlled by dividing the screen area into two display areas, a first display area and a second display area, and using the first display area as a primary screen and the second display area as a secondary screen, and a third display mode in which display is controlled by using the second display area as the primary screen and the first display area as the secondary screen, and a display control process of, when switching from the first display mode to the second display mode is performed, displaying a first window having a highest display priority among windows of applications being executed in the first display mode, on the primary screen and displaying a thumbnail image corresponding to a second window other than the first window among the applications being executed in the first display mode, on the secondary screen, and in the display control process, when the second display mode and the third display mode are switched, display the window of any of the applications being executed, on the primary screen, according to a preset priority in a case in which there is no display target window to be displayed on the primary screen after the switching, and display the thumbnail image on the secondary screen after the switching in a case in which there is no display target window to be displayed on the secondary screen after the switching.

10. The information processing apparatus according to claim 3, wherein the priority is set in advance such that the window of the application being executed, which is hidden later, has a higher priority.

11. The information processing apparatus according to claim 3, wherein the priority is set in advance such that the window of the application being executed, which is activated later, has a higher priority.

12. The information processing apparatus according to claim 3, wherein the priority is set such that a window of an application, which is more frequently used by a user, has a higher priority.

13. A control method in an information processing apparatus including one foldable display, a memory configured to store at least a program, and a processor configured to execute the program stored in the memory, the control method comprising:

causing the processor to execute the program stored in the memory to perform:

a display mode switching step of switching between a first display mode in which display is controlled by using a screen area of the display as one display area, and a second display mode in which display is controlled by dividing the screen area into two display areas, a first display area and a second display area, and a display control step of, when switching from the first display mode to the second display mode is performed, displaying a first window having a highest display priority among windows of applications being executed in the first display mode, in the first display area and displaying a first thumbnail image corresponding to a second window other than the first window among the applications being executed in the first display mode, in the second display area, wherein in the display control step:

in a case in which all the windows of the applications being executed are hidden in the first display mode before the switching to the second display mode, the window of any of the applications being executed is displayed in the first display area when the switching to the second display mode is performed, and in a case in which any of a plurality of thumbnail images is selected by a user, the first thumbnail image is hidden and the second window corresponding to the selected thumbnail image is displayed, as an active window, in the display area in which the first thumbnail image is displayed, out of the first display area and the second display area.

14. A control method in an information processing apparatus including one foldable display, a memory configured to store at least a program, and a processor configured to execute the program stored in the memory, the control method comprising:

causing the processor to execute the program stored in the memory to perform:

a display mode switching step of switching between a first display mode in which display is controlled by using a screen area of the display as one display area, and a second display mode in which display is controlled by dividing the screen area into two display areas, a first display area and a second display area, and a display control step of, when switching from the first display mode to the second display mode is performed, displaying a first window having a highest display priority among windows of applications being executed in the first display mode, in the first display area and displaying a first thumbnail image corresponding to a second window other than the first window among the applications being executed in the first display mode, in the second display area, wherein in the display control step:

when the switching from the first display mode to the second display mode is performed, in a case in which there is no display target window to be displayed in the first display area after the switching, the window of any of the applications being executed is displayed in the first display area according to a preset priority, and in a case in which any of a plurality of thumbnail images is selected by a user, the first thumbnail image is hidden and the second window corresponding to the selected thumbnail image is displayed, as an active window, in the display area in which the first thumbnail image is displayed, out of the first display area and the second display area.

15. A control method in an information processing apparatus including one foldable display, a memory configured to store at least a program, and a processor configured to execute the program stored in the memory, the control method comprising:

causing the processor to execute the program stored in the memory to perform:

a display mode switching step of switching between a first display mode in which display is controlled by using a screen area of the display as one display area, a second display mode in which display is controlled by dividing the screen area into two display areas, a first display area and a second display area, and using the first display area as a primary screen and the second display area as a secondary screen, and a third display mode in which display is controlled by using the second display area as the primary screen and the first display area as the secondary screen, and a display control step of, when switching from the first display mode to the second display mode is performed, displaying a first window having a highest display priority among windows of applications being executed in the first display mode, on the primary screen and displaying a thumbnail image corresponding to a second window other than the first window among the applications being executed in the first display mode, on the secondary screen, wherein, in the display control step, when the second display mode and the third display mode are switched, the window of any of the applications being executed is displayed on the primary screen according to a preset priority in a case in which there is no display target window to be displayed on the primary screen after the switching, and the thumbnail image is displayed on the secondary screen after the switching in a case in which there is no display target window to be displayed on the secondary screen after the switching.

* * * * *